US010410311B2

(12) United States Patent
Vembu et al.

(10) Patent No.: US 10,410,311 B2
(45) Date of Patent: Sep. 10, 2019

(54) METHOD AND APPARATUS FOR EFFICIENT SUBMISSION OF WORKLOAD TO A HIGH PERFORMANCE GRAPHICS SUB-SYSTEM

(71) Applicant: Intel Corporation, Santa Clara, CA (US)

(72) Inventors: Balaji Vembu, Folsom, CA (US); Kritika Bala, Folsom, CA (US); Murali Ramadoss, Folsom, CA (US); Hema Nalluri, Hyderabad (IN); Jeffery Boles, Folsom, CA (US); Jeffrey Frizzell, Folsom, CA (US); Joseph Koston, Folsom, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/062,691

(22) Filed: Mar. 7, 2016

(65) Prior Publication Data

US 2017/0256019 A1   Sep. 7, 2017

(51) Int. Cl.
*G06T 1/20* (2006.01)
*G06F 9/455* (2018.01)
*G06F 9/48* (2006.01)

(52) U.S. Cl.
CPC .............. *G06T 1/20* (2013.01); *G06F 9/4881* (2013.01); *G06F 2009/45579* (2013.01)

(58) Field of Classification Search
None
See application file for complete search history.

(56) References Cited

U.S. PATENT DOCUMENTS

| 8,788,565 B2* | 7/2014 | Bevan | G06F 3/1214 |
| | | | 705/301 |
| 2003/0061417 A1 | 3/2003 | Craddock et al. | |
| 2007/0273698 A1* | 11/2007 | Du | G06F 9/30167 |
| | | | 345/501 |
| 2012/0147021 A1 | 6/2012 | Cheng et al. | |
| 2014/0026137 A1 | 1/2014 | Vembu et al. | |
| 2014/0122838 A1 | 5/2014 | Llamas et al. | |
| 2014/0201500 A1* | 7/2014 | Niell | G06F 15/7807 |
| | | | 712/36 |
| 2015/0379662 A1 | 12/2015 | Ramadoss et al. | |

OTHER PUBLICATIONS

PCT International Search Report and Written Opinion of the International Searching Authority for PCT/US2017/013795 dated Apr. 19, 2017.
International Preliminary Report on Patentability received for PCT Patent Application No. PCT/US2017/013795, dated Sep. 20, 2018, 15 pages.

* cited by examiner

*Primary Examiner* — Sarah Le
(74) *Attorney, Agent, or Firm* — Jaffery Watson Mendonsa & Hamilton LLP

(57) ABSTRACT

Embodiments provide for an apparatus comprising a graphics processing subsystem including one or more graphics engines and a graphics scheduler to schedule a submission queue of multiple work items for execution on the one or more graphics engines of the graphics processing subsystem. The graphics scheduler can be configured to build the submission queue via a write to a memory mapped address that is mapped to logic within the graphics processing subsystem and to explicitly submit the submission queue to the graphics engine after the build of the submission queue.

20 Claims, 19 Drawing Sheets

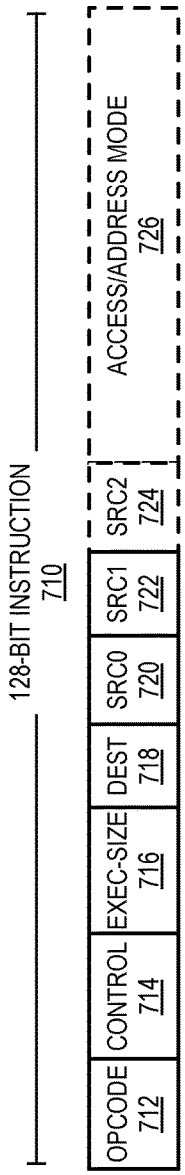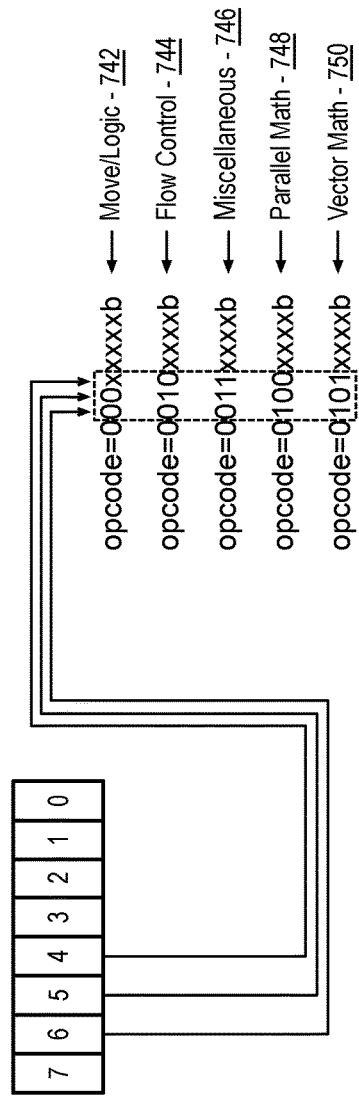
FIG. 7

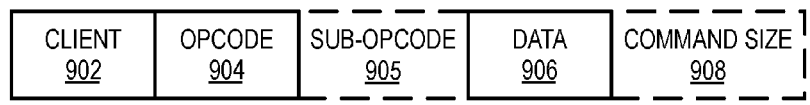
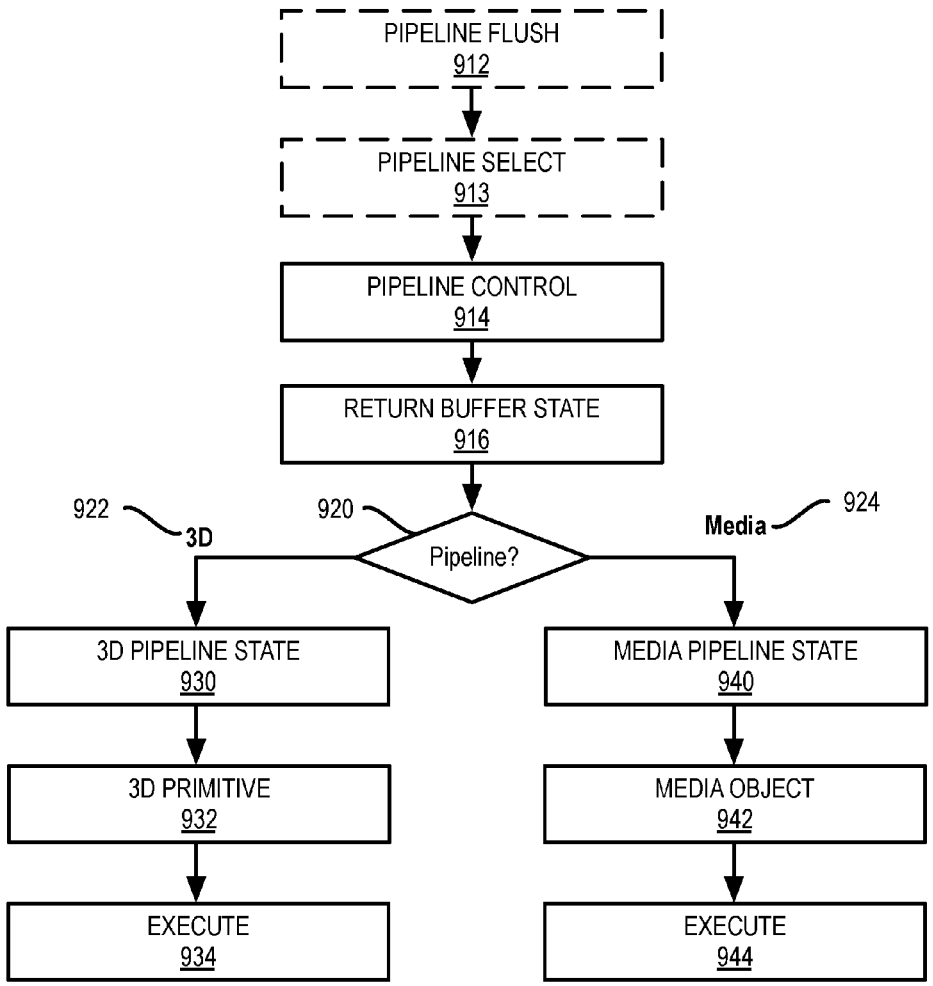

METHOD AND APPARATUS FOR EFFICIENT SUBMISSION OF WORKLOAD TO A HIGH PERFORMANCE GRAPHICS SUB-SYSTEM

TECHNICAL FIELD

Embodiments generally relate to graphics processing logic. More particularly, embodiments relate to scheduling logic for a graphics processing subsystem.

BACKGROUND

A graphics processing subsystem is a high performance hardware engine that depends on supporting graphics driver software to provide a workload for processing. To maximize the use of the graphics processing system, the supporting software should keep the graphics processing subsystem loaded with a list of work items to process. Across successive generations and versions of graphics processing hardware, the processing performance can increase rapidly. As the performance of the hardware engine increases, it can become increasingly difficult to keep the processing hardware busy. Accordingly, scenarios may develop during graphics processing operations in which the graphics processing resources are unused while the hardware waits for the supporting software to provide the next task.

Additionally, an application processor or general-purpose processor executes the graphics driver software. When the general-purpose processor is used to scheduler operations for the graphics processing system, the processor may be repeatedly interrupted during work item processing, which may prevent the processor from going into a low power state while graphics processing operations are being performed.

BRIEF DESCRIPTION OF THE DRAWINGS

The various advantages of the embodiments will become apparent to one skilled in the art by reading the following specification and appended claims, and by referencing the following drawings, in which:

FIG. 7 illustrates a graphics processor execution unit instruction format according to an embodiment;

FIG. 9A is a block diagram illustrating a graphics processor command format according to an embodiment;

FIG. 9B is a block diagram illustrating a graphics processor command sequence according to an embodiment;

DESCRIPTION OF EMBODIMENTS

Figure 1:
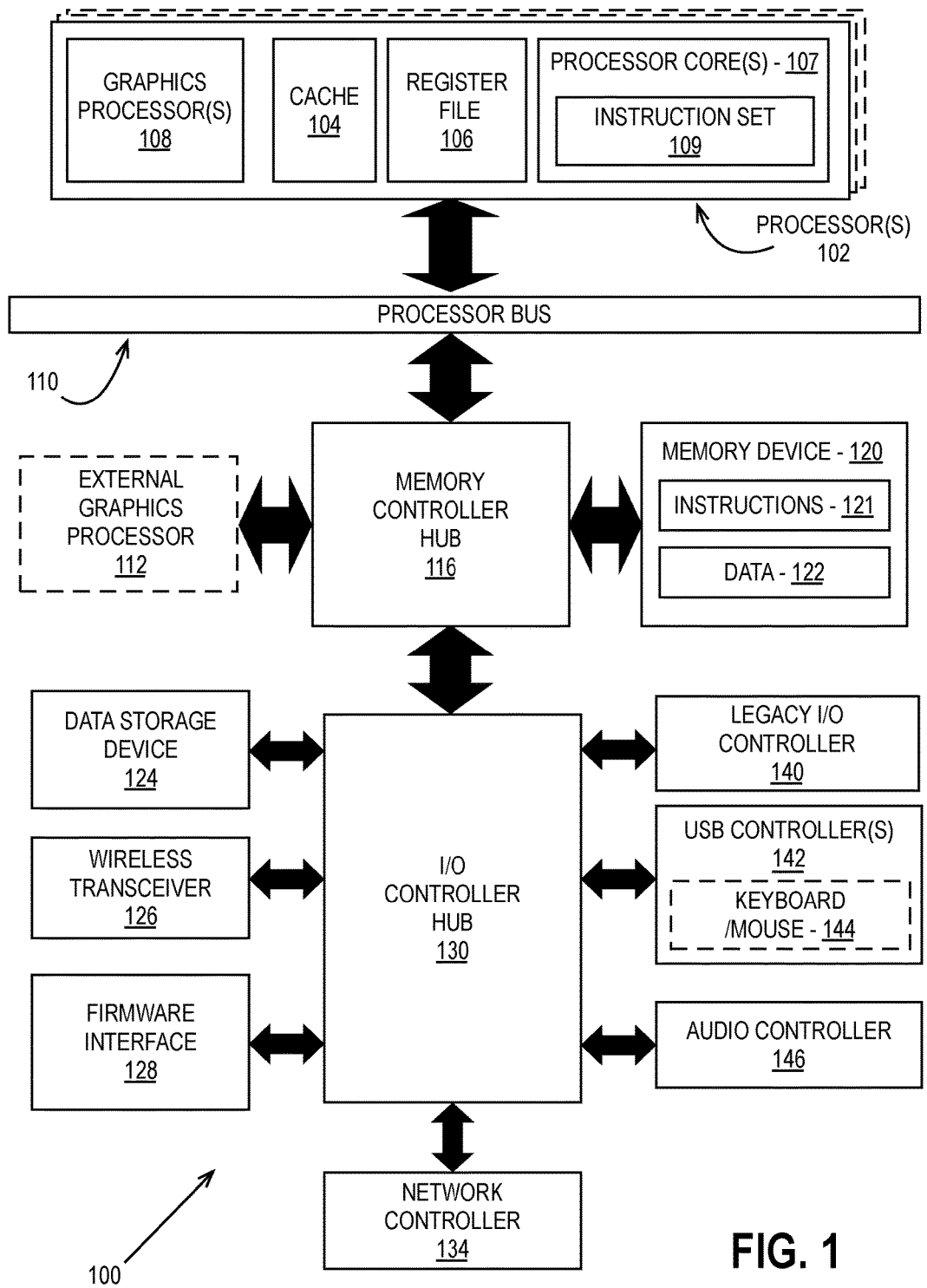
FIG. 1 is a block diagram of an embodiment of a computer system with a processor having one or more processor cores and graphics processors.

Embodiments described herein provide for a method, apparatus, and associated systems to enable a schedule infrastructure that provides for a more efficient submission of workloads to a high performance graphics sub-system relative to scheduling infrastructures known in the art. Work is submitted in terms of elements, where an element is a work-item that contains a pointer to the work queue in memory. One embodiment provides for a submission queue that is double buffered on both submission and execution, allowing a graphics engine to latch in a work queue while the scheduler constructs the next work queue. There is a clear separation of filling in the elements in the queue and then submitting the queue to hardware by writing the control register and a control register is associated with the submission queue to provide a mechanism for explicitly submitting a queue for execution, such that a new submission queue can be constructed without causing an automatic pre-emption of executing work items as in some existing scheduler implementations.

For the purposes of explanation, numerous specific details are set forth to provide a thorough understanding of the various embodiments described below. However, it will be apparent to a skilled practitioner in the art that the embodiments may be practiced without some of these specific details. In other instances, well-known structures and devices are shown in block diagram form to avoid obscuring the underlying principles, and to provide a more thorough understanding of embodiments. Although some of the following embodiments are described with reference to a graphics processor, the techniques and teachings described herein may be applied to various types of circuits or semiconductor devices, including general purpose processing devices or graphic processing devices. Reference herein to "one embodiment" or "an embodiment" indicate that a particular feature, structure, or characteristic described in connection or association with the embodiment can be included in at least one of such embodiments. However, the appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

In the description that follows, FIGS. 1-12 provide an overview of exemplary data processing system and graphics processor logic that incorporates or relates to the various embodiments. FIGS. 13-19 provide specific details of the various embodiments. Although some of the following embodiments are described with reference to a graphics processor, similar techniques and teachings can be applied to other types of circuits or semiconductor devices, as the teachings are applicable to any processor or machine that manipulates or processes image data.

System Overview

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In on embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
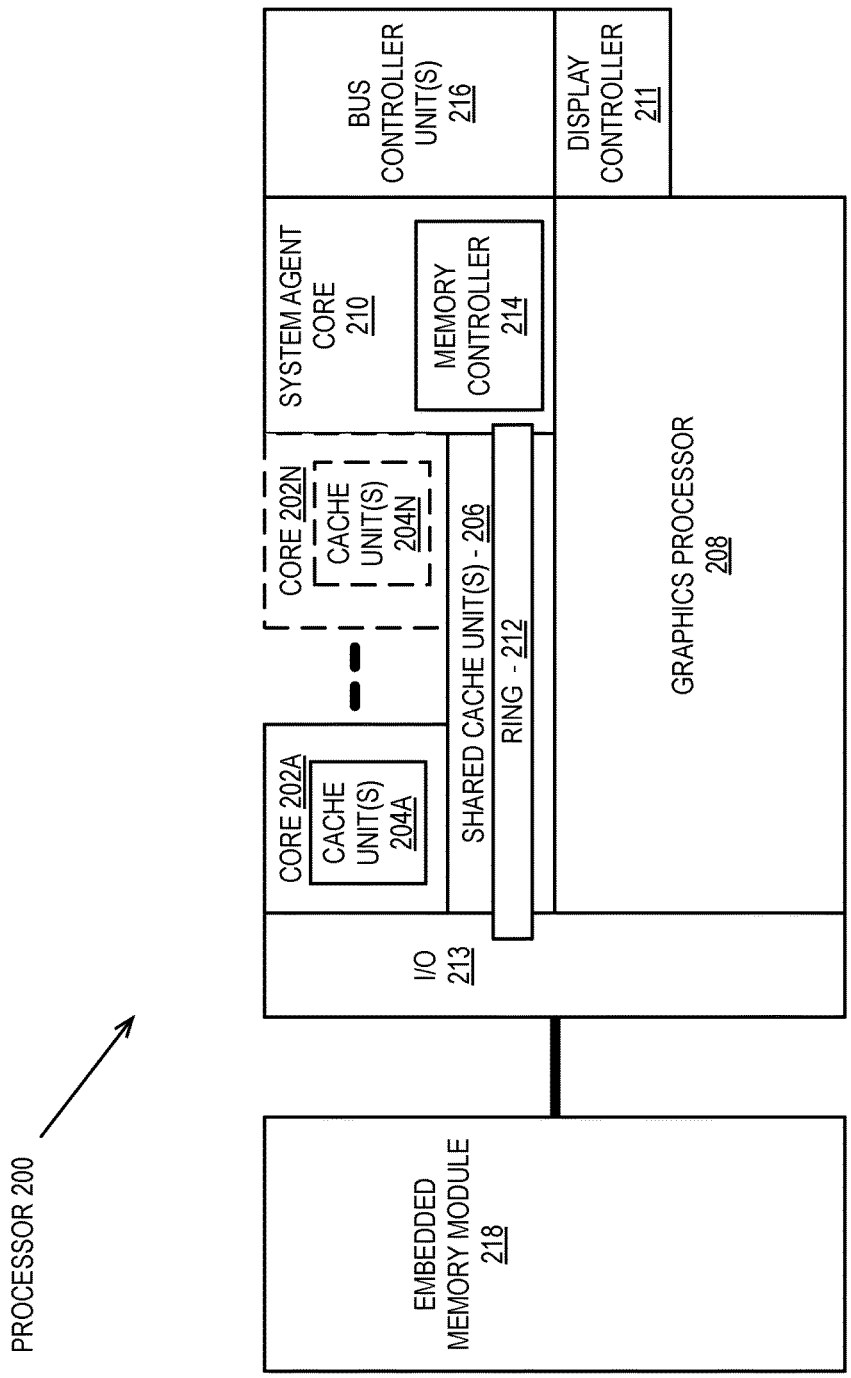
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N.

In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
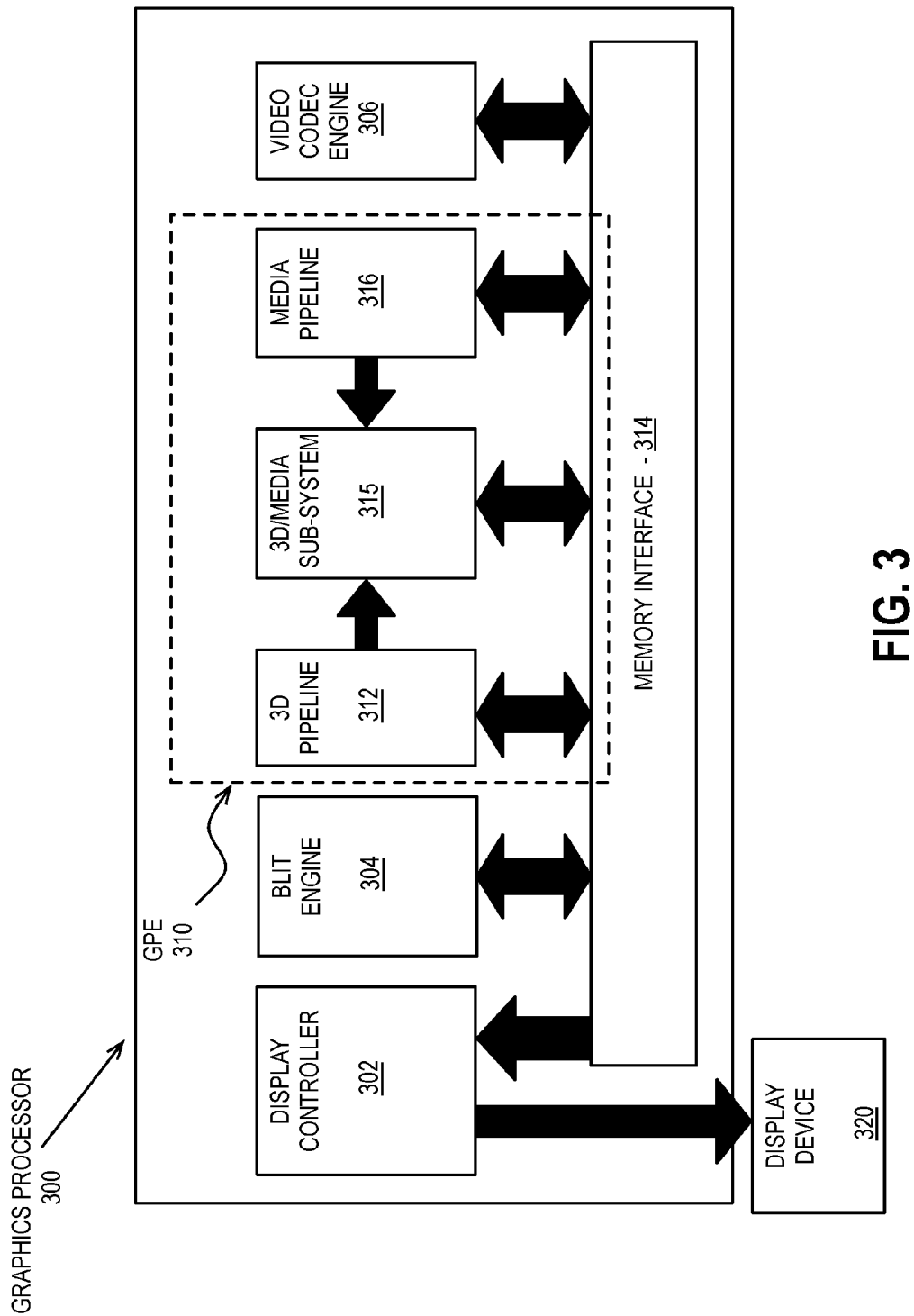
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421 M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, graphics processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

3D/Media Processing

Figure 4:
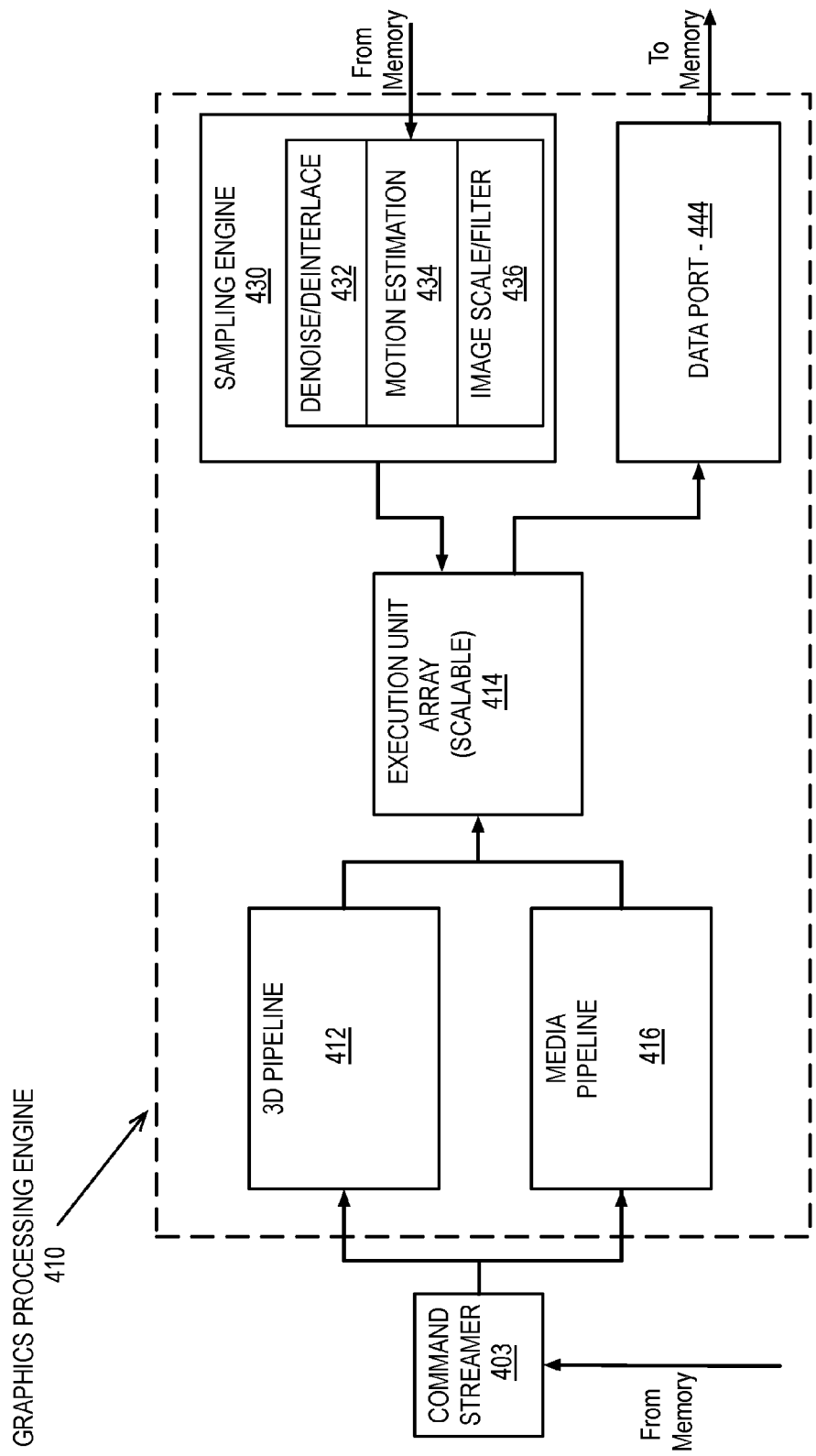
FIG. 4 is a block diagram of an embodiment of a graphics processing engine for a graphics processor.

FIG. 4 is a block diagram of a graphics processing engine 410 of a graphics processor in accordance with some embodiments. In one embodiment, the GPE 410 is a version of the GPE 310 shown in FIG. 3. Elements of FIG. 4 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The commands are directives fetched from a ring buffer, which stores commands for the 3D and media pipelines 412, 416. In one embodiment, the ring buffer can additionally include batch command buffers storing batches of multiple commands. The 3D and media pipelines 412, 416 process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GPE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Execution Units

Figure 5:
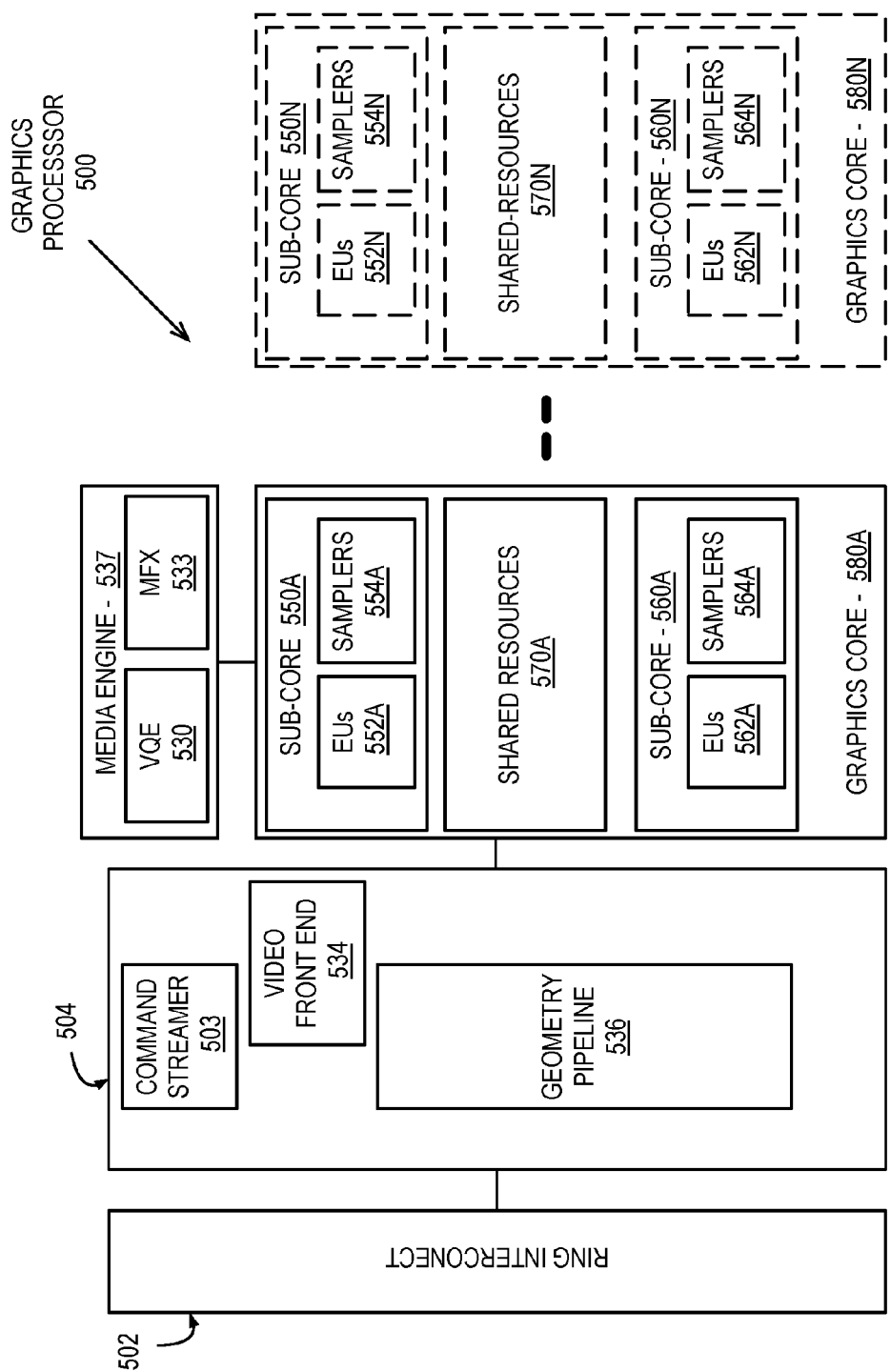
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Figure 6:
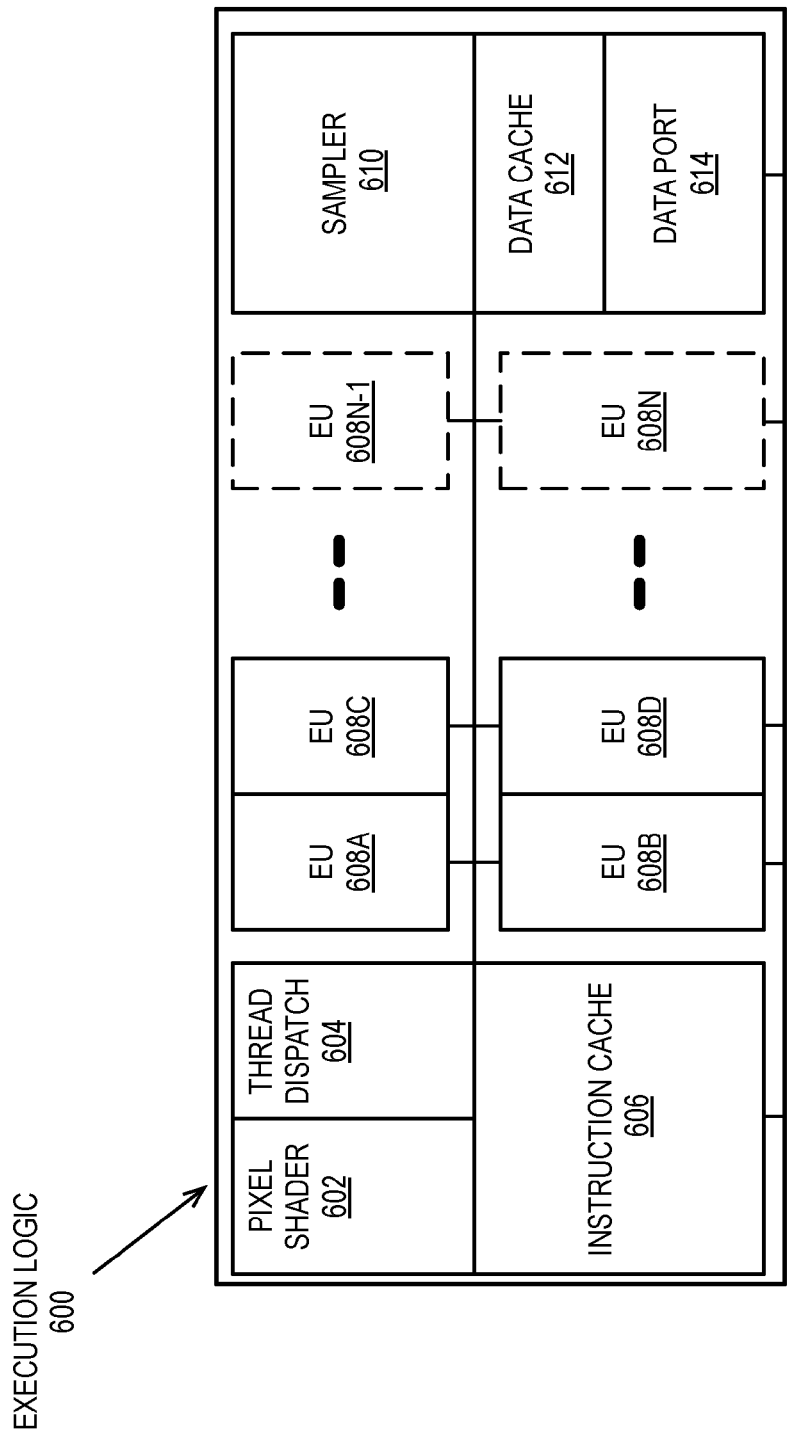
FIG. 6 is a block diagram of thread execution logic including an array of processing elements.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-608N. In some embodiments, each execution unit (e.g. 608A) is an individual vector processor capable of executing multiple simultaneous threads and processing multiple data elements in parallel for each thread. In some embodiments, execution unit array 608A-608N includes any number individual execution units.

In some embodiments, execution unit array 608A-608N is primarily used to execute "shader" programs. In some embodiments, the execution units in array 608A-608N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-608N. For example, the geometry pipeline (e.g., 536 of FIG. 5) dispatches vertex processing, tessellation, or geometry processing threads to thread execution logic 600 (FIG. 6). In some embodiments, thread dispatcher 604 can also process runtime thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an application programming interface (API)-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode information 726 specifying, for example, whether direct register addressing mode or indirect register addressing mode is used. When direct register addressing mode is used, the register address of one or more operands is directly provided by bits in the instruction 710.

In some embodiments, the 128-bit instruction format 710 includes an access/address mode field 726, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 710 may use byte-aligned addressing for source and destination operands and when in a second mode, the instruction 710 may use 16-byte-aligned addressing for all source and destination operands.

In one embodiment, the address mode portion of the access/address mode field 726 determines whether the instruction is to use direct or indirect addressing. When direct register addressing mode is used bits in the instruction 710 directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
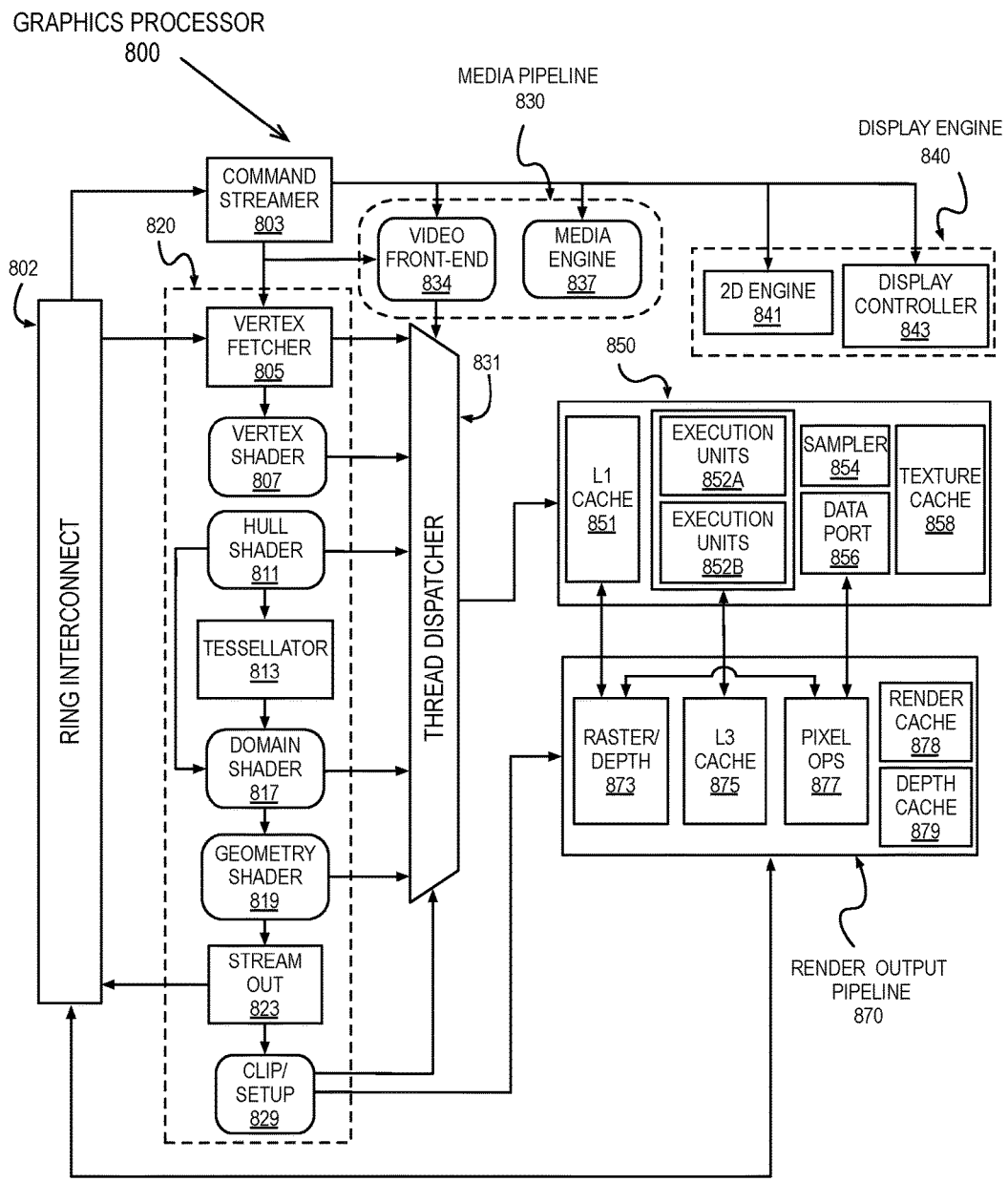
FIG. 8 is a block diagram of another embodiment of a graphics processor which includes a graphics pipeline, a media pipeline, a display engine, thread execution logic, and a render output pipeline.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general-purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into an associated pixel-based representation. In some embodiments, the render output pipeline 870 includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into in a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
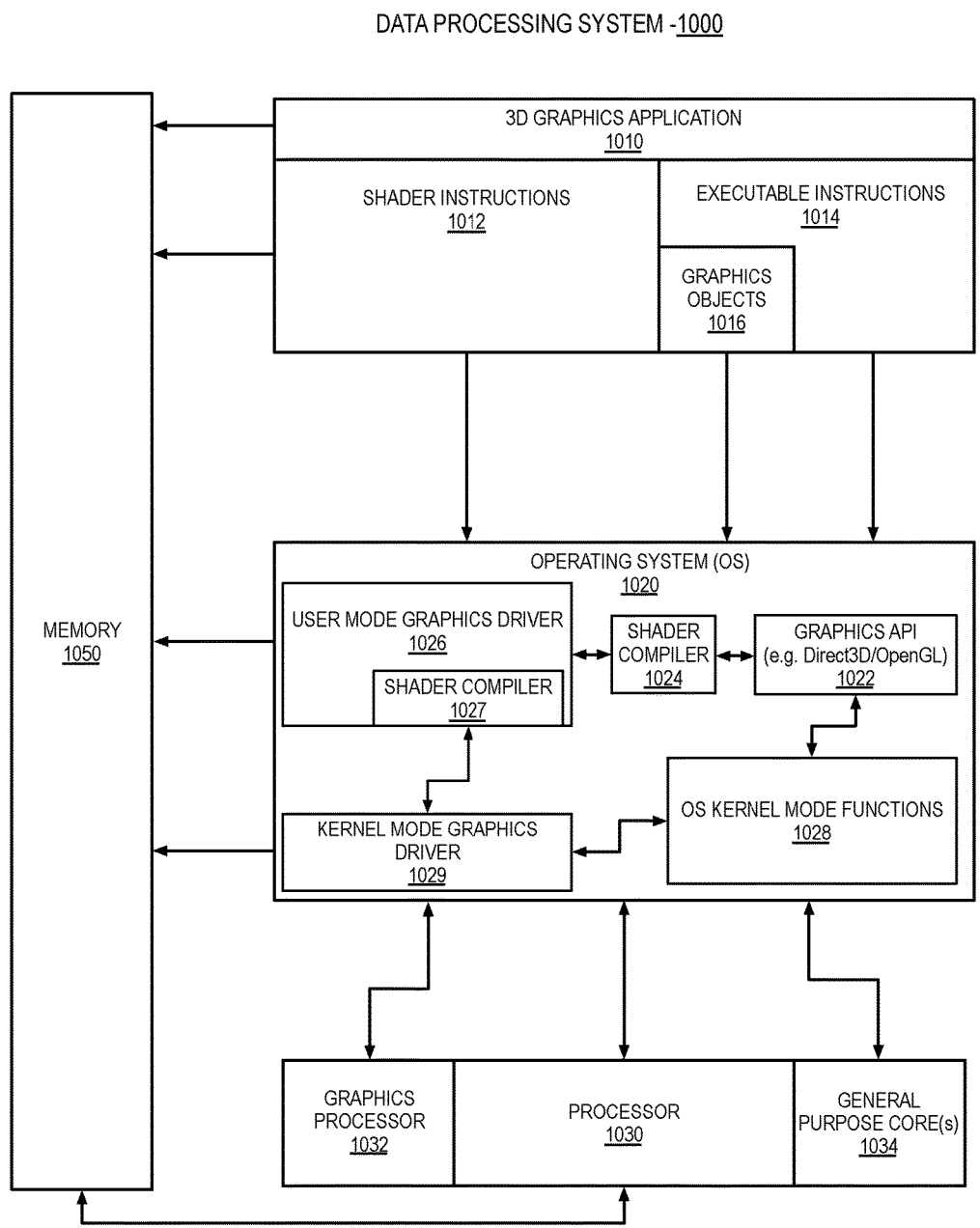
FIG. 10 illustrates exemplary graphics software architecture for a data processing system according to an embodiment.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API or the OpenGL API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
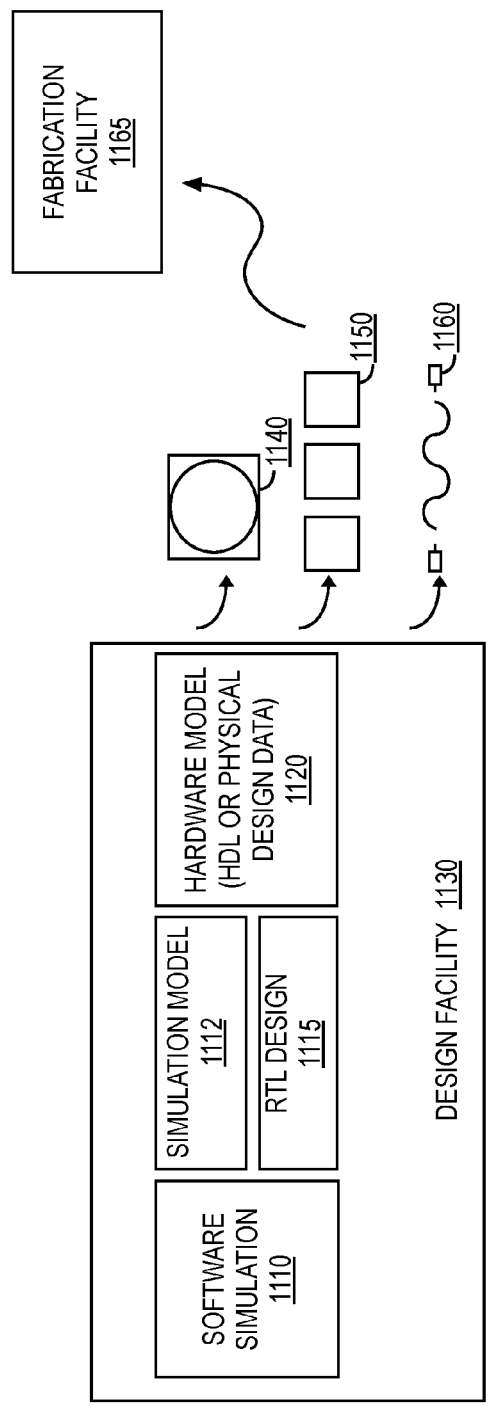
FIG. 11 is a block diagram illustrating an IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core. A register transfer level (RTL) design can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 12:
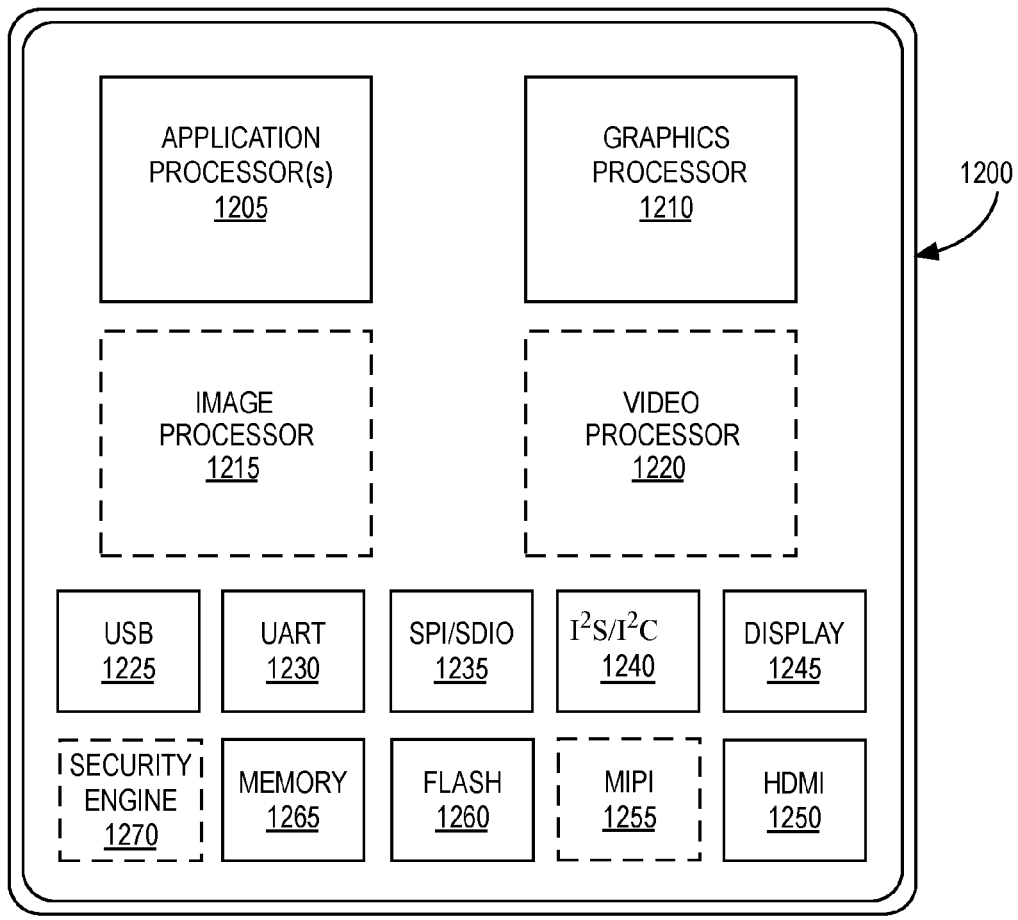
FIG. 12 is a block diagram illustrating an exemplary system on a chip integrated circuit that may be fabricated using one or more IP cores, according to an embodiment.

FIG. 12 is a block diagram illustrating an exemplary system on a chip integrated circuit 1200 that may be fabricated using one or more IP cores, according to an embodiment. The exemplary integrated circuit includes one or more application processors 1205 (e.g., CPUs), at least one graphics processor 1210, and may additionally include an image processor 1215 and/or a video processor 1220, any of which may be a modular IP core from the same or multiple different design facilities. The integrated circuit includes peripheral or bus logic including a USB controller 1225, UART controller 1230, an SPI/SDIO controller 1235, and an $I^2S/I^2C$ controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Additionally, other logic and circuits may be included in the processor of integrated circuit 1200, including additional graphics processors/cores, peripheral interface controllers, or general-purpose processor cores.

Method and Apparatus for Efficient Submission of Workload to a High Performance Graphics Sub-System Existing implementations of graphics processing hardware use a work item queue that allows the submission of two work items at a time. In some instances and for some workloads, even though two work items are submitted, both work items may rapidly complete execution, resulting in an idle hardware period before additional workloads may be submitted. Increasing the depth of the work item queue to enable the submission of a larger of work items may be sufficient for some workloads, however existing implementations operate on the granularity of the entire work item queue, such that software submits a full set of work items and waits until submitted tasks are complete before submitting additional work items. Additionally, writing a new work queue while hardware is still processing previous work results in pre-empting the currently running queue and then running the new queue.

Figure 13:
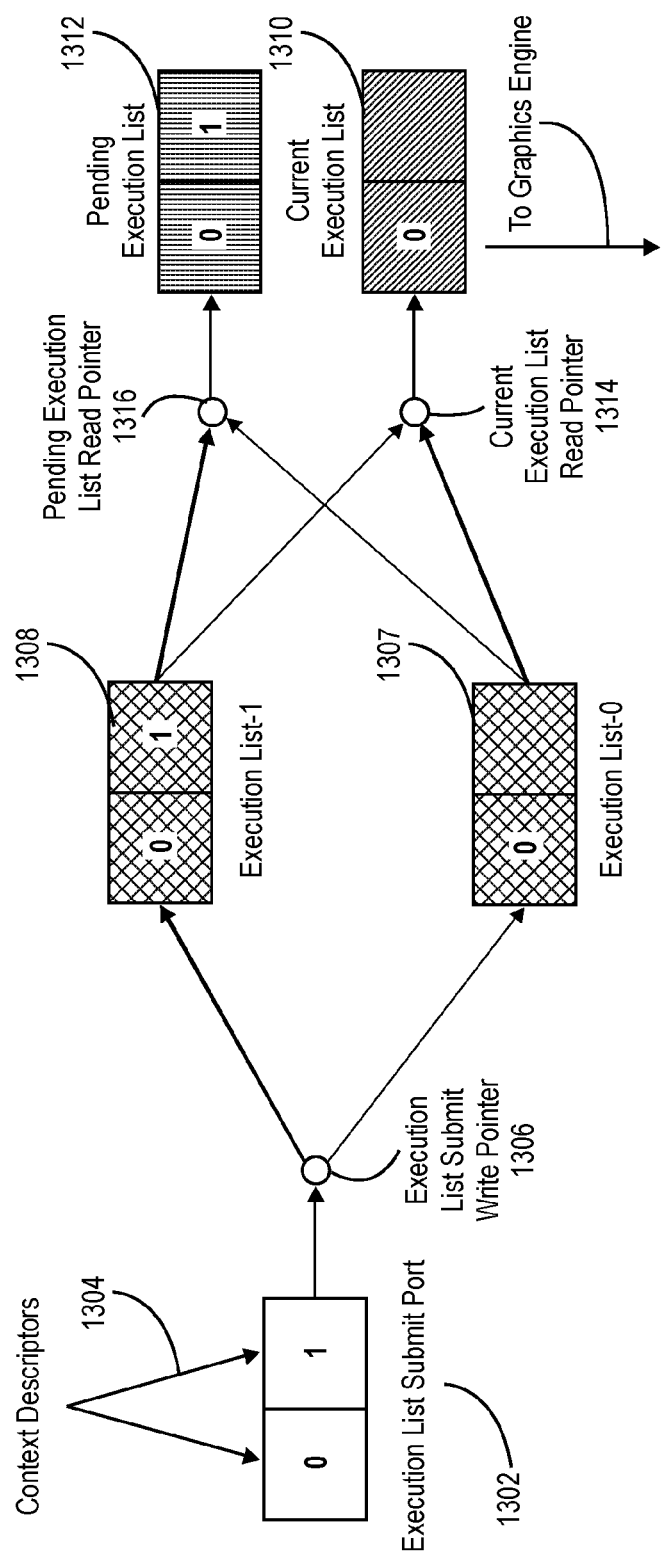
FIG. 13 is a diagram illustrating a dual work item execution list system that may be used to schedule graphics processor operations.

FIG. 13 is a diagram illustrating a dual work item execution list system 1300 that may be used to schedule graphics processor operations. The dual work item execution list system 1300 includes an execution list submit port 1302 to which two context descriptors 1304 (e.g., 0, 1) are submitted. Based on the configuration of an execution list submit write pointer 1306, context descriptors 1304 that are submitted via the execution list submit port 1302 are submitted to one of a zeroth execution list 1307 or a first execution list 1308 in graphics subsystem registers. In one implementation, a graphics engine of the graphics subsystem includes a current execution list 1310 and a pending execution list 1312. The graphics engine can latch data in each of the current execution list and the pending execution list from one of the execution lists 1307, 1308 in memory based on read pointers (e.g., the current execution list read pointer 1314 or pending execution list read pointer 1316).

In one implementation, an interrupt is generated when submitted execution list data in memory has been latched into hardware, indicating that new execution list data may be written. When a graphics engine completes a set of work items, an interrupt is triggered to indicate that the work items are complete. Submitting a new set of work items to the execution list submit port 1302 before the current execution list 1310 is complete causes the executing work items to be pre-empted by the newly submitted work items.

While the dual work item execution list system 1300 is sufficient for some versions or implementations of a graphics processing subsystem, the system may be less optimal for higher performance graphics processing subsystems. For example, in some implementations the graphic processing subsystem includes multiple graphics engines, which may cause a large number of hardware interrupts during the submission, completion, and execution of work items. Additionally, higher performance graphics processing subsystems may benefit from a more robust scheduling system that allows for submission of a larger number of work items and for the submission of additional work items without necessarily causing the pre-emption of executing work items.

Embodiments described herein provide for a method, apparatus, and associated systems to enable a schedule infrastructure that provides for a more efficient submission of workloads to a high performance graphics sub-system relative to scheduling infrastructures known in the art. Work is submitted in terms of elements, where an element is a work-item that contains a pointer to the work queue in memory. One embodiment provides for a graphics processing apparatus including a number of registers for writing elements and a control register to invoke an action on the element list. The apparatus additionally includes a submission queue that is double buffered on both submission and execution, allowing a graphics engine to latch in a work queue while the scheduler constructs the next work queue. There is a clear separation of filling in the elements in the queue and then submitting the queue to hardware by writing the control register.

The control register enables an explicit load of a work item list when submitting a queue for execution and configures the nature of the submission to the graphics engine. Based on the configuration of the control register, a load operation can be performed, an append operation can be performed, or a pre-empt operation can be performed upon submission of the submission queue. The control register load mechanism submits a submission queue by, in one embodiment, copying the elements in the submission queue to an execution queue of a graphics engine. The control register append mechanism enables the graphics driver to append work items to a pending queue without pre-empting the current running queue. The scheduling infrastructure does not require all elements of a submission queue to be filled before the queue is submitted and partially filled queues elements may be validly submitted to the graphics engine. Work items can be subsequently appended to a working queue without automatically pre-empting existing items within the execution queue. To pre-empt items within the execution queue, the control register pre-empt mechanism can be used.

In one embodiment the scheduling infrastructure includes additional features for application in a power-constrained environment. For example, a "pre-empt to Idle" bit is provided in the control register to enable the graphics driver for the graphics subsystem to quickly pre-empt executing tasks and force a graphics engine to an idle state. When pre-empt to idle is invoked, the current partially executed list is saved into the submission queue as a partially executed submission queue. Once the graphics engine is in the idle state, the graphics engine may be powered off to conserve power, enabling a graphics processor to quickly drop into a low power sleep state or rapidly scale down graphics processing resources to reduce active power consumption. When the graphics engine returns to an active state from the low power state, execution of the partially executed work items can be immediately resumed by simply re-submitting the partially executed submission queue. By automatically saving and restoring the partially executed queue, execution on the graphics engine can be quickly resumed when returning from a low power state without requiring the graphics driver to construct a new queue for submission.

In one embodiment, fine granularity control over interrupts related to the submission, execution, and completion of work items. Individual interrupts caused by various events denoting work execution through the queue can be masked.

Figure 14:
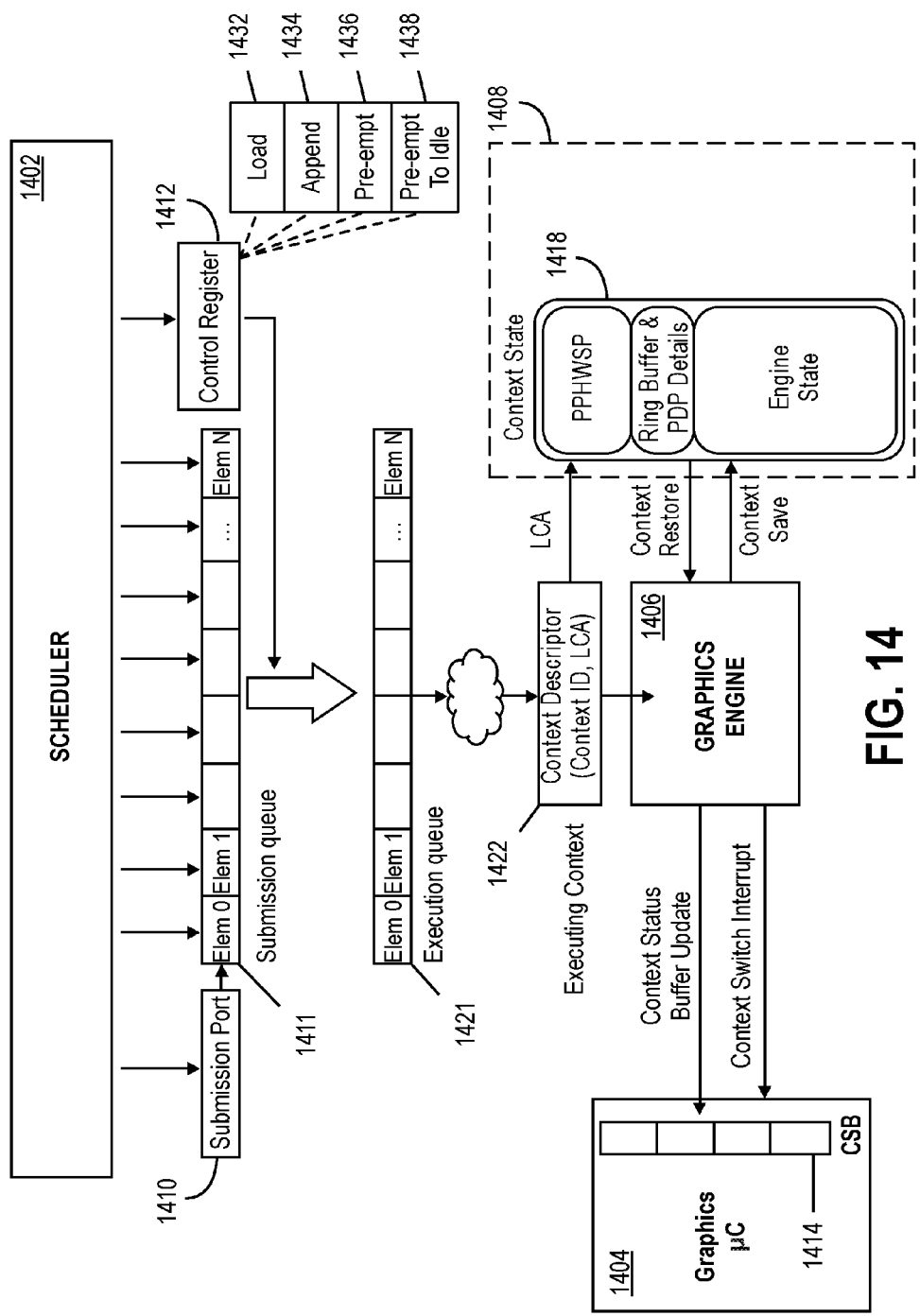
FIG. 14 is a block diagram illustrating a graphics processing subsystem scheduling infrastructure according to an embodiment.

FIG. 14 is a block diagram illustrating a graphics processing subsystem scheduling infrastructure 1400 according to an embodiment. The scheduling infrastructure 1400 includes a scheduler 1402 and a graphics microcontroller (μC) 1404 for a graphics engine 1406. Each graphics engine 1406 can include context storage memory 1408 to which context state 1418 may be stored while the graphics engine 1406 is in a low power state. The scheduler 1402 schedules work items for the graphics engine 1406. In one embodiment the scheduler 1402 resides in a graphics driver, such as a kernel mode graphics driver 1029 as in FIG. 10. In one embodiment the scheduler 1402 resides within the graphics microcontroller 1404.

The scheduler 1402 schedules work items for the graphics engine 1406 by writing to a submission queue 1411 via a submission port 1410 associated with a graphics engine 1406. The scheduler 1402 can load the submission queue 1411 for submission to the graphics engine 1406 by performing a memory mapped I/O (MMIO) write to the submission queue 1411 via an MMIO offset associated with the submission port 1410. Work is submitted in terms of elements, where an element is a work-item that contains a pointer to a work queue in memory. The size of the submission queue 1411 can vary among embodiments, where up to "N" elements may be queued within the submission queue 1411 and an additional "N" elements may be queued within an execution queue 1421 that stores elements to be processed by the graphics engine 1406. In one embodiment up to eight elements (e.g., Elem0-Elem7) may be written to the submission queue, although other embodiments provide for the submission of greater or fewer elements.

Each element in the submission queue 1411 can include a command or a batch of multiple commands. Each element may be associated with a different execution context. Information identifying the execution context for the command or commands associated with each element is stored within the element entry. Valid entries in the queue can be indicated via a valid bit associated with each entry. Empty entries in the queue can be indicated as invalid and the graphics engine 1406 will bypass those entries.

The graphics driver can write to the submission queue 1411 without causing hardware to automatically start executing. The submission queue 1411 is submitted to the graphics engine 1406 by writing to a control register 1412. The scheduler 1402 can prepare the submission queue 1411 and write to the control register 1412 when the elements on the execution queue 1421 are complete. A load selector 1432 of the control register 1412 can be configured to perform a load operation, which causes hardware within scheduling infrastructure 1400 to copy contents of submission queue 1411 to the execution queue 1421 associated with the graphics engine 1406. The graphics engine 1406 can begin executing work items by reading context information from elements of the execution queue 1421 upon the next context switch boundary, for example, upon completion of the current execution. Between the submission queue 1411 and the execution queue 1421, a list of up to 2*N elements can be prepared for execution by the graphics engine 1406, where N is the number of elements within each queue. In one embodiment, each queue contains eight elements, allowing up to sixteen elements to be prepared for execution.

In one embodiment a partially filled submission queue 1411 can be submitted to the graphics engine 1406, such that small workloads can be submitted without filling the entire submission queue. Subsequent elements can then be appended to a submitted queue by the scheduler 1402 by writing to an append selector 1434 of the control register 1412 when submitting the elements to be appended. The appended elements can then be appended to the execution queue 1421, where the execution queue contains less than the maximum number of elements before the additional elements are appended.

Should the scheduler 1402 intend to pre-empt the current execution queue 1421, the scheduler can write to the pre-empt selector 1436 of the control register 1412 during execution and the graphics engine 1406 will stop executing the current execution queue 1421 and copy the elements in the submission 1410 to the execution queue 1421 for execution.

The graphics engine 1406 can track the hardware state associated with the execution context of currently executing work items. Various methods of context and state tracking can be used. An exemplary method is shown in which the graphics engine 1406 tracks a context descriptor 1422 for the executing context and multiple contexts can be active. In one embodiment the context descriptor 1422 includes a context ID, which is a unique identifier associated with the context and a logical context address (LCA) that points to a context state 1418 stored in the context storage memory 1408. The context state 1418 includes a per process hardware status page (PPHWSP), Ring Buffer & Page Directory Pointer Table (PDP) details, and engine state associated with the context. One having skill in the art will recognize that the specific details of context and hardware state tracking can vary according to embodiments. However the context state 1418 is defined, during a context switch, the context state 1418 for the context that is going on to the graphics engine 1406, be loaded or restored to the graphics engine 1406 from the context storage memory 1408. When the context is switched out, the context can be saved to the context storage memory 1408.

In one embodiment the graphics microcontroller 1404 includes a context status buffer (CSB) 1414 that is used to track the execution of work items on the graphics engine 1406. The graphics engine 1406 triggers a context switch interrupt on the graphics microcontroller 1404 to indicate that a context switch is occurring on the graphics engine 1406. The graphics engine 1406 then writes context status information to the context status buffer 1414. The graphics microcontroller 1404 can use information stored in the context status buffer 1414 to make scheduling operations, such as whether to pre-empt execution of a context that is blocked while awaiting access to a shared resource. One embodiment provides for a graphics processor having multiple instances of the graphics engine 1406. In such embodiment, the graphics microcontroller 1404 schedules work items across the multiple graphics engines.

In one embodiment the scheduling infrastructure 1400 includes fine granularity masking for interrupts generated by or routed to the graphics engine 1406 while executing the execution queue 1421. For example, interrupts that the graphic engines 1406 generates relating to the scheduling, execution and completion of work items can be masked, such that those interrupts will not be routed to an application processor. Instead, the interrupts can be configured such that graphics microcontroller 1404 will handle all scheduling related interrupts.

In one embodiment, the scheduling infrastructure 1400 includes functionality to enhance low power operation. For example, in preparation for a transition to a low power state, the scheduler 1402 can cause a context switch to unload an executing context and idle the graphics engine 1406. This feature enables the graphic driver to idle the graphics engine 1406 using a single MMIO write, reducing the latency associated with transitioning the graphic engine 1406 into the low power state. During preparation enter the low power state the graphics engine saves the execution queue 1421 in a partially executed state into the submission queue 1411 and saves the submission queue to memory. Upon a return from the low power state, the submission queue is restored and the scheduler 1402 can simply re-submit the suspended queue by writing to the load selector 1432 of the control register 1412.

In one embodiment, to cause a pre-empt to idle, the scheduler 1402 writes to a pre-empt-to-idle selector 1438 in the control register 1412 to cause the graphics engine 1406 to pre-empt the executing work items and enter an idle state as soon as the hardware is able to do so. When pre-empting to an idle state, instead of copying elements from the submission queue 1411 to the execution queue 1421, any partially executed elements in the execution queue 1421 are copied to the submission queue 1411. Embodiments may also use other methods of causing a pre-empt to idle. In one embodiment a scheduler 1402 write to the pre-empt selector 1436, with additional configuration data, can indicate to the graphics engine that the pre-emption will be to an idle state. For example and in one embodiment, writing to the pre-empt selector 1436 with an empty or invalid submission queue can automatically cause a pre-empt to idle after the graphics engine determines that all elements of the submission queue are empty or invalid. In such embodiment the partially executed elements of the execution queue 1421 may not be copied back to the submission queue 1411.

Figure 15:
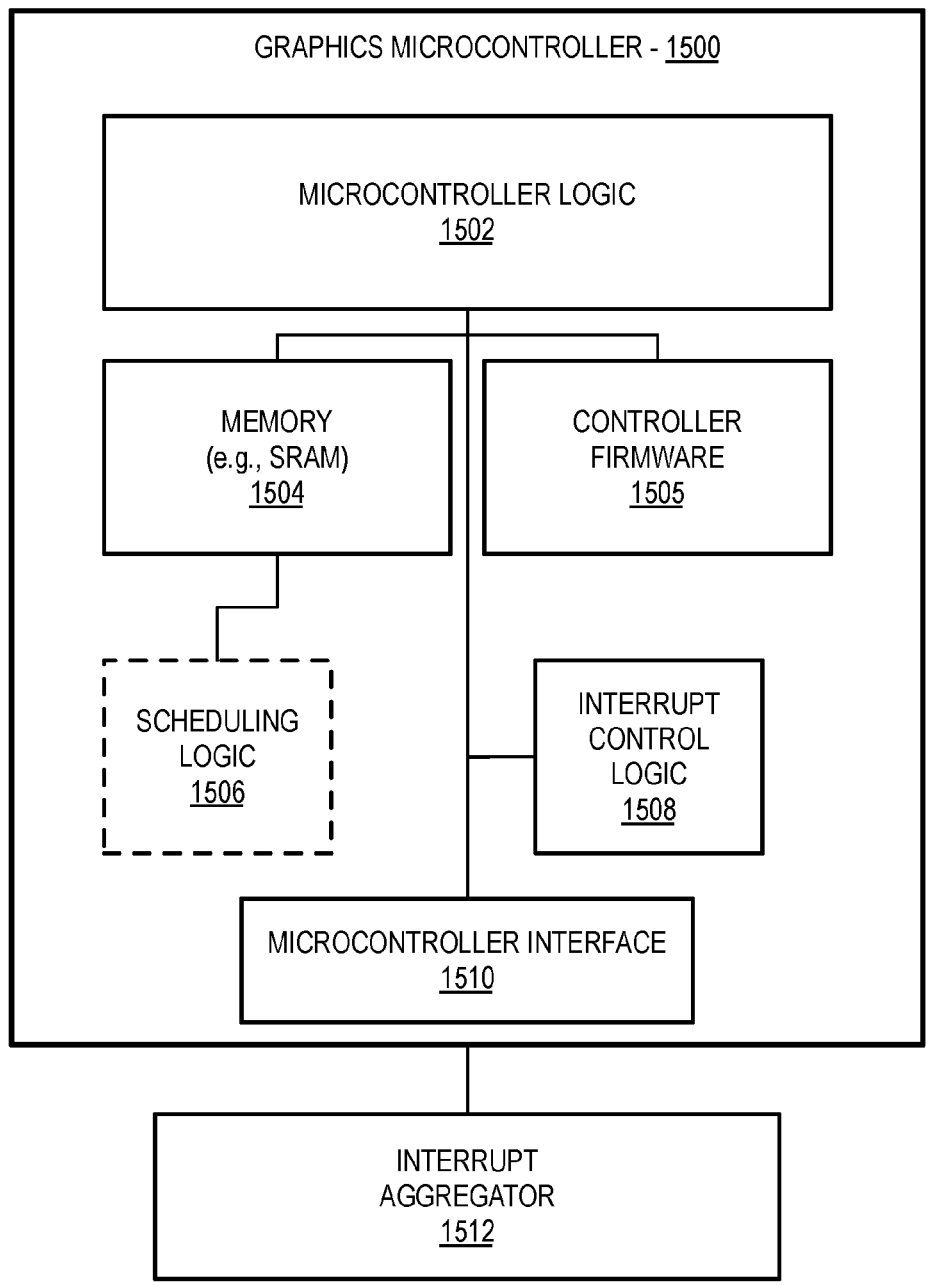
FIG. 15 is a block diagram of a graphics microcontroller, according to an embodiment.

FIG. 15 is a block diagram of a graphics microcontroller 1500, according to an embodiment. The graphics microcontroller 1500 can be a variant of the graphics microcontroller 1404 of FIG. 14. In one embodiment the graphics microcontroller 1500 includes microcontroller logic 1502, memory 1504, controller firmware 1505, interrupt control logic 1508, and a microcontroller interface 1510. In one embodiment the graphics microcontroller 1500 additionally includes scheduling logic 1506. The microcontroller logic 1502 is configured perform microcontroller operations and execute instructions provided by the controller firmware 1505. A graphics driver, via the microcontroller interface 1510, can load the controller firmware 1505 onto the graphics microcontroller 1500 when initializing the graphics subsystem. Memory 1504, such as, but not limited to SRAM memory, can store data for use by the microcontroller logic 1502 and the controller firmware 1505. In one embodiment the memory 1504 can include scheduling logic 1506 to perform scheduling operations for one or more graphics engines. The scheduling logic 1506 can also be loaded by graphics driver software during graphics subsystem initialization. In one embodiment the scheduling logic 1506 is hardware based scheduling logic that can be configured at least in part by the controller firmware 1505. In either configuration, graphics driver software can provide work items for execution to the scheduling logic 1506 and the scheduling logic 1506 can determine one or more graphics engines on which to schedule the work items. The scheduling logic 1506 can then build and submit a submission queue of work items as the scheduler 1402 of FIG. 14.

Interrupt control logic 1508 is included in the graphics microcontroller 1500 in one embodiment. The interrupt control logic provides fine granularity control over interrupts related to the submission, execution, and completion of work items. In one embodiment the interrupt control logic 1508 includes a local advanced programmable interrupt controller (LAPIC) to handle interrupts from various sources, including software triggered interrupts, application processor interrupts, general purpose processor interrupts, or graphics processor interrupts. In one embodiment the interrupt control logic 1508 can configure an interrupt aggregator 1512 coupled with the graphics microcontroller 1500. The interrupt aggregator can collect and aggregate interrupts from the various sources and provide the collected interrupts to the interrupt control logic 1508.

For example and in one embodiment, individual interrupts caused by various events denoting the progress of work execution within a graphics engine can be configured such that those interrupts will not be sent to the graphics engine or general purpose logic and instead will be handled by the graphics microcontroller 1500. In an embodiment in which scheduling logic 1506 is enabled on the graphics microcontroller 1500, the interrupt control logic 1508 can be configured such that any scheduling related graphics engine interrupts can be routed via the interrupt aggregator to the scheduling logic 1506 in the graphics microcontroller 1500, enabling the abstraction of the fine-grained details associated with graphics engine scheduling from the general purpose processors and the graphics driver logic executing on the general purpose processors. The graphics driver and general purpose processing logic can then be alerted only to coarse-grained scheduling events or events that cannot be handled by the graphics microcontroller 1500.

Figure 16:
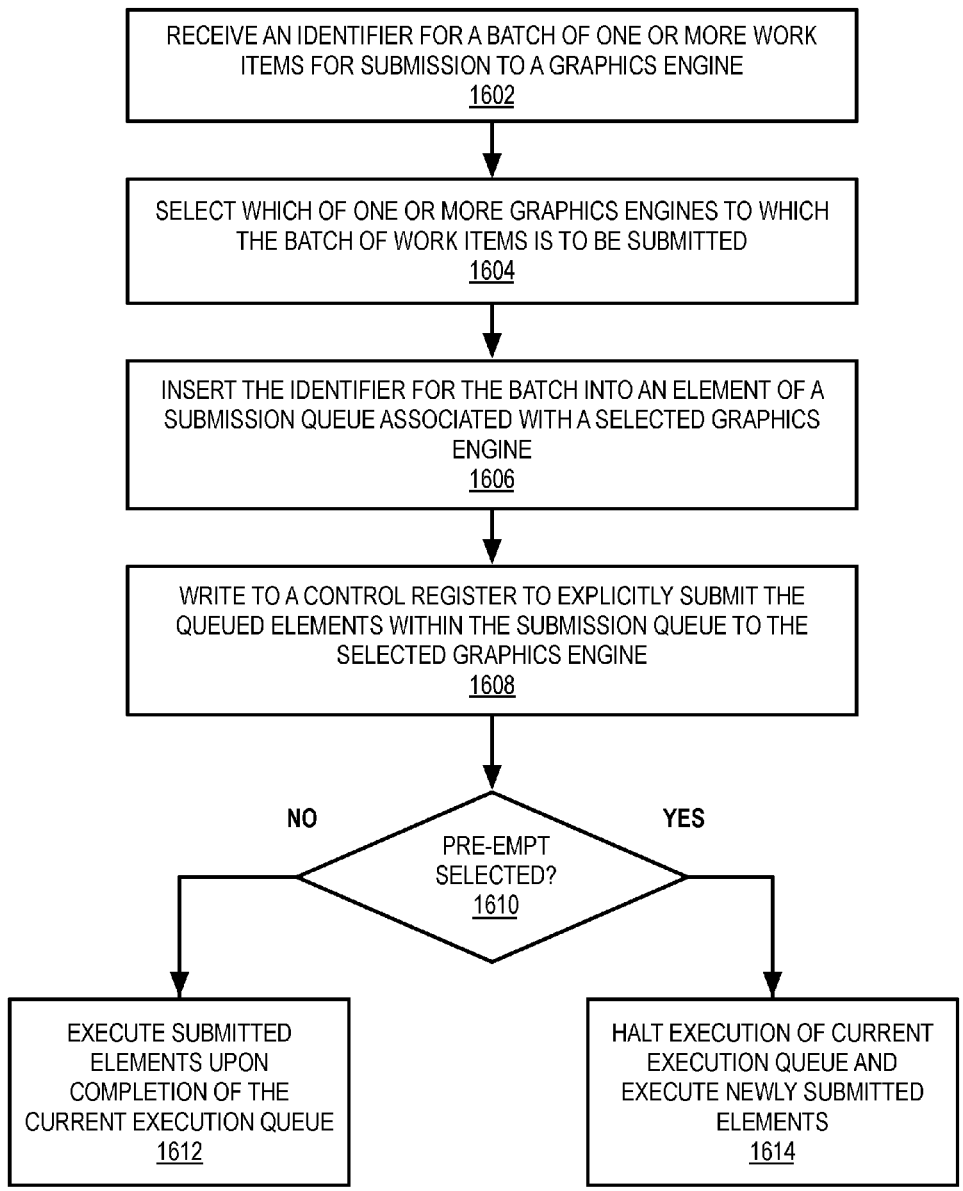
FIG. 16 is a flow diagram of graphics engine schedule logic, according to an embodiment.

FIG. 16 is a flow diagram of graphics engine schedule logic 1600, according to an embodiment. A graphics driver, such as a kernel mode graphics driver 1029 as in FIG. 10, can be configured to perform operations of the graphics engine scheduling logic 1600. On some systems some scheduling operations can be performed at least in part by a user mode graphics driver, such as the user mode graphics driver 1026 as in FIG. 10. In one embodiment the operations of the graphics engine scheduling logic 1600 are performed by a microcontroller, such as the graphics microcontroller 1404 of FIG. 14 or the graphics microcontroller 1500 of FIG. 15.

In one embodiment the graphics engine scheduling logic 1600 can receive an identifier for a batch of one or more work items for submission to a graphics engine, as shown at block 1602. The logic can then select which of the one or more graphics engines to which the batch of work items is to be submitted at block 1604. In various embodiments, various techniques are used to determine where workloads are to be scheduled. For example, the selection at block 1604 can be based on load balancing logic that attempts to load balance graphics operations across available graphics engines. Additionally, dynamic scaling logic may be included to dynamically scale up or down graphics resources based on the current graphics workload.

As shown at block 1606, the graphics engine scheduling logic 1600 can insert the identifier into an element of a submission queue associated with a selected graphics engine. In one embodiment the identifier is a pointer to the batch of one or more work items and the batch of one or more work items is stored in memory associated with the processing subsystem. At any point after inserting the identifier into the element of the submission queue at block 1606, the scheduling logic can write to a control register to submit elements within the submission queue to the selected graphics engine, as shown at block 1608. The submission queue is not required to be full before queued elements are submitted and the submission queue can be constructed without causing an automatic pre-emption of existing work items, as in some existing implementations.

Subsequent operations of the graphics engine scheduling logic 1600 depend on whether a pre-empt selector within the control register is selected, as shown at 1610. If a pre-empt selector is not selected, the logic can execute submitted elements upon completion of the current execution queue, as shown at block 1612. If the pre-empt selector is selected, at block 21614 the graphics engine scheduling logic 1600 can halt execution of the current execution queue and execute the newly submitted elements immediately. In one embodiment, the elements of the submission queue are copied to the execution queue of the graphics hardware before the elements are executed from the execution queue. In one embodiment the graphics engine can also be pre-empted to an idle state.

Figure 17:
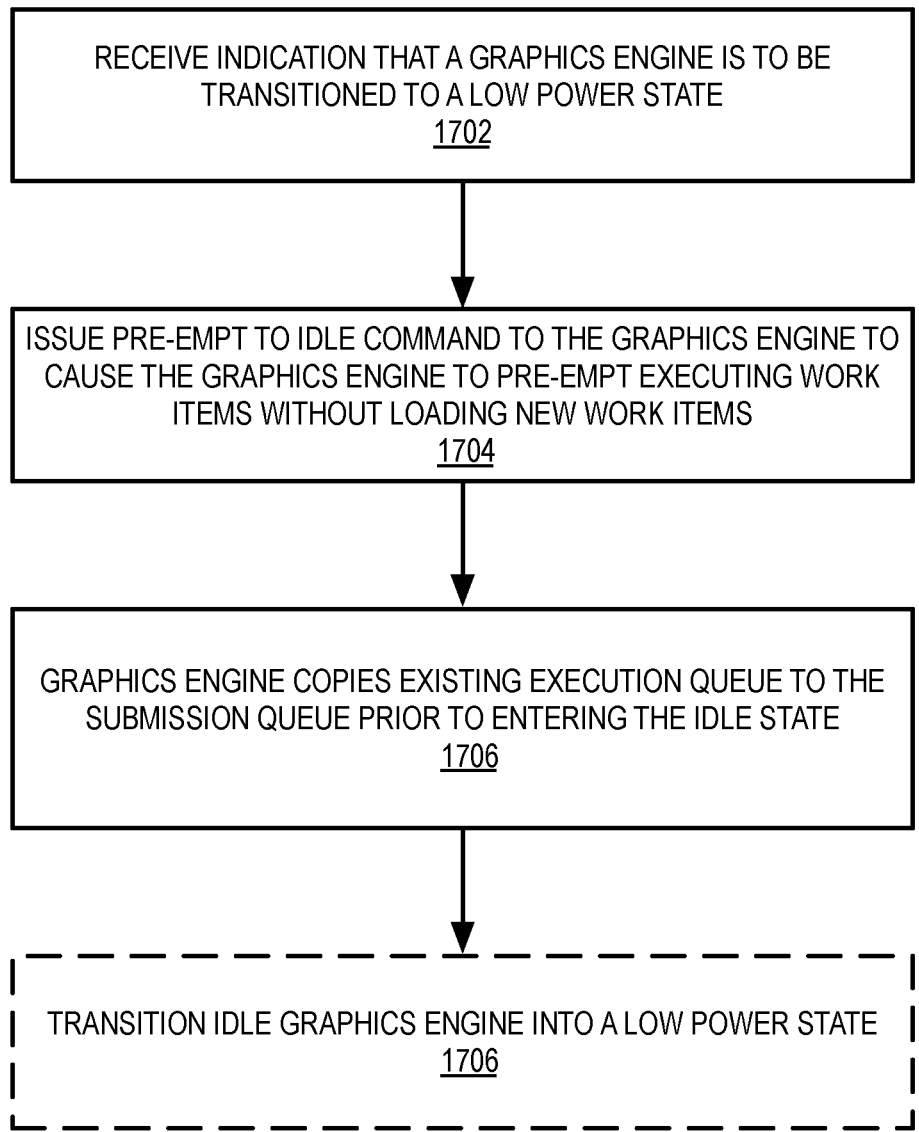
FIG. 17 is a flow diagram of pre-empt to idle logic, according to an embodiment.

FIG. 17 is a flow diagram of pre-empt to idle logic 1700, according to an embodiment. The pre-empt to idle logic 1700 may be a sub-component of the graphics engine scheduling logic 1600 of FIG. 16. Some of the pre-empt to idle logic 1700 can also be performed by power management logic within a graphics subsystem. The pre-empt to idle logic 1700 can receive an indication, for example, from power management logic, that a graphics engine is to be transitioned into a low power state at block 1702. In response, the pre-empt to idle logic 1700 can issue a pre-empt to idle command to the graphics engine to cause the graphics engine to pre-empt existing work items without loading new work items. In other words, any work items represented by elements within a pending submission queue are not loaded as a result of the pre-empt to idle command at block 1704. Instead, at block 1706, the graphic engine copies the existing execution queue to the submission queue. In one embodiment this may overwrite any staged elements within the submission queue. Overwriting the submission queue with the execution queue enables the graphics engine to be restarted when returning from the low power state without requiring the re-construction of the previous execution queue by simple re-submitting the submission queue. Scheduling logic can then re-load the previously pending submission queue. At block 1706, the pre-empt to idle logic 1700 can transition the idle graphics engine to a low power state. In one embodiment, the operation at block 1706 is performed by power management logic upon an indication that the graphics engine is in an idle state.

Figure 18:
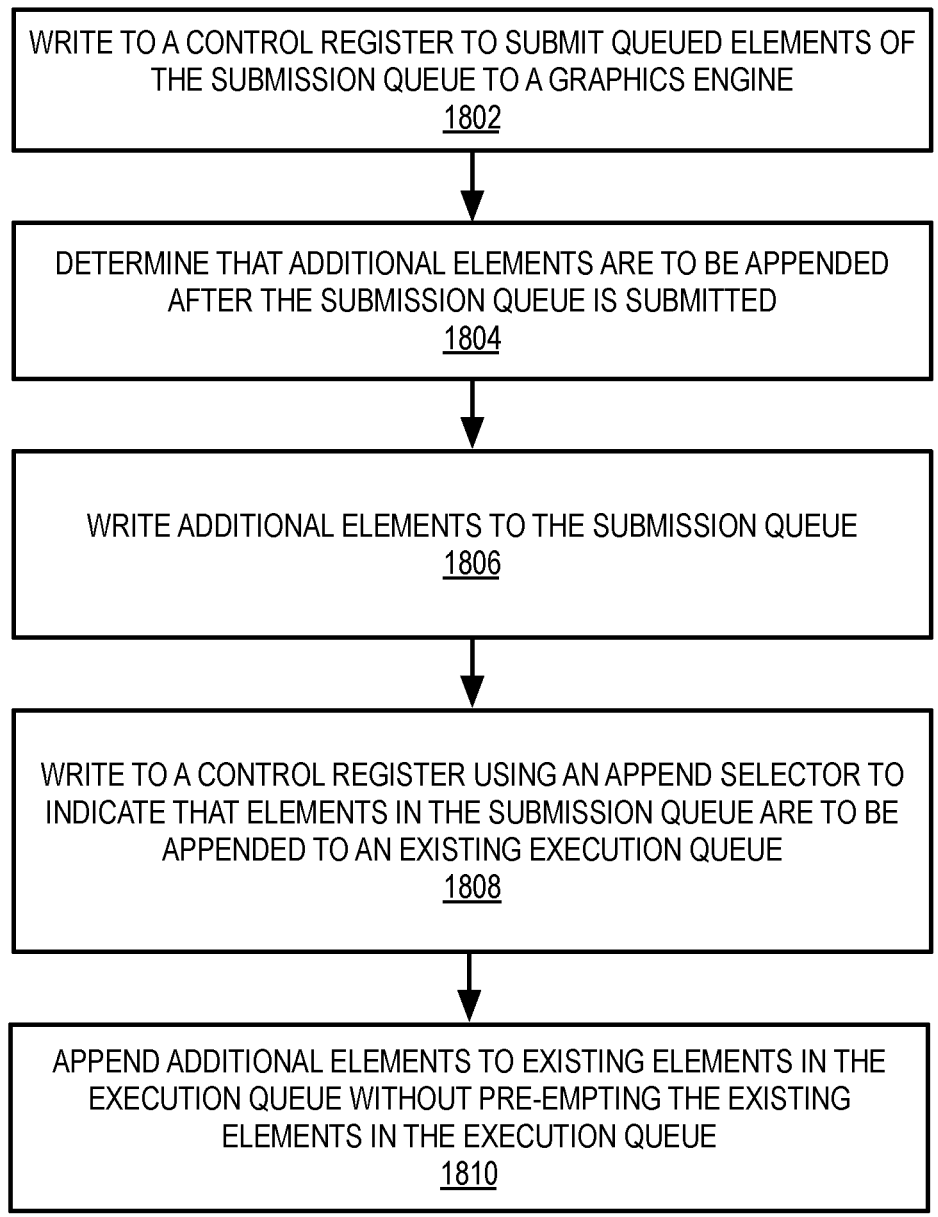
FIG. 18 is a flow diagram of graphics engine submission append logic, according to an embodiment.

FIG. 18 is a flow diagram of graphics engine submission append logic 1800, according to an embodiment. The graphics engine submission append logic 1800 can be used by the graphics scheduler to append additional work items to previously submitted work items. At block 1802, the graphics scheduler can write to a control register to submit queue elements of the submission queue to the graphics engine. The graphics scheduler can submit a less than full submission queue, so the execution queue of the graphics engine may not include the maximum possible number of elements after the submission queue is submitted. Accordingly, the graphics engine submission append logic 1800 may determine that additional elements are to be appended to the previously submitted elements after the submission queue is submitted. This may occur in circumstances in which it may be beneficial to execute a small number of work items in conjunction with previously submitted work items instead of waiting to full the submission queue. The graphics engine submission append logic 1800 can write the additional elements to the submission queue at block 1806. The elements of the submission queue can be submitted via a write to a control register using an append selector. As shown at block 1808, the append selector indicates that elements in the submission queue are to be appended to previously submitted elements in an existing execution queue. At block 1810, the graphics engine submission append logic 1800 can then append the additional elements into the execution queue without pre-empting the existing elements in the execution queue. In one embodiment the appended elements are added to the end of the submission queue and the number of additionally submitted elements is limited based on the maximum number of elements allowed within the execution queue.

Figure 19:
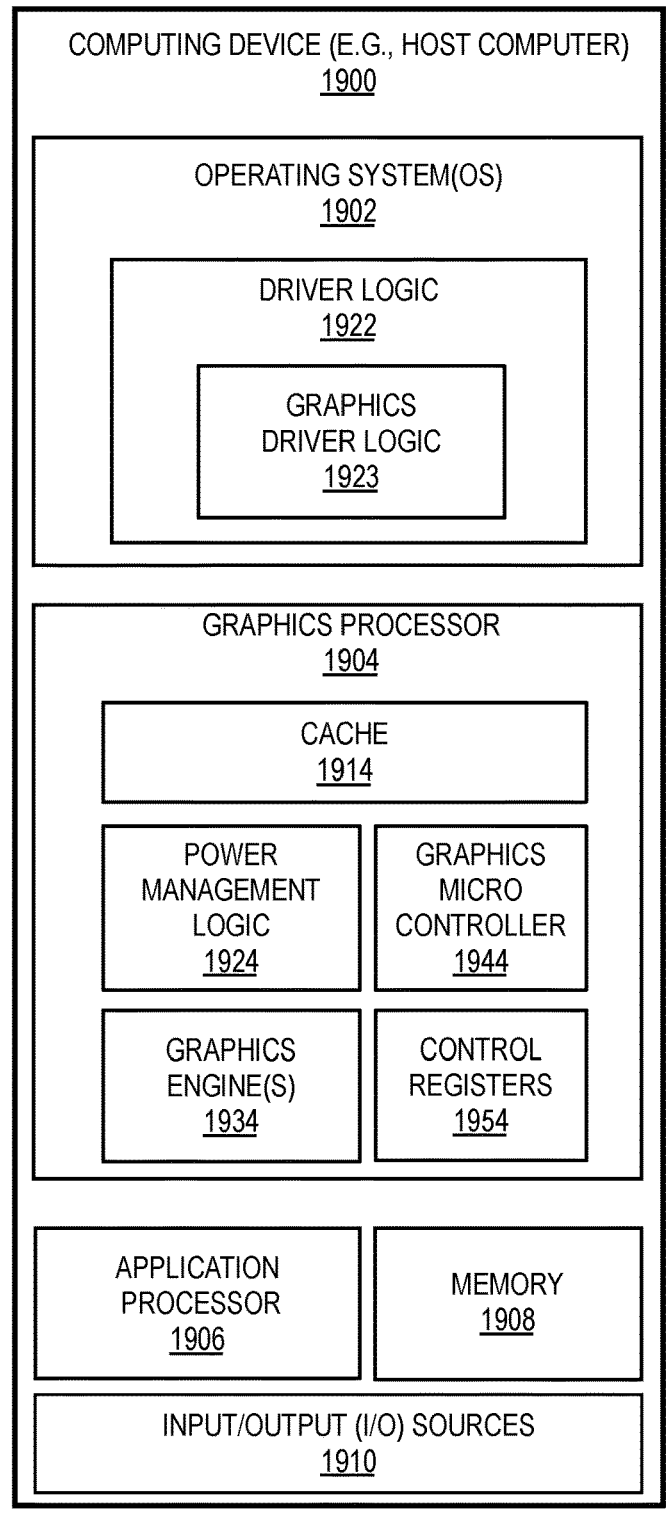
FIG. 19 is a block diagram of a computing device including a graphics processor, according to an embodiment.

FIG. 19 is a block diagram of a computing device 1900 including a graphics processor 1904, according to an embodiment. The computing device 1900 can be a computing device such as the data processing system 100 as in of FIG. 1. The computing device 1900 may also be or be included within a communication device such as a set-top box (e.g., Internet-based cable television set-top boxes, etc.), global positioning system (GPS)-based devices, etc. The computing device 1900 may also be or be included within mobile computing devices such as cellular phones, smartphones, personal digital assistants (PDAs), tablet computers, laptop computers, e-readers, smart televisions, television platforms, wearable devices (e.g., glasses, watches, bracelets, smartcards, jewelry, clothing items, etc.), media players, etc. For example, in one embodiment, the computing device 1900 includes a mobile computing device employing an integrated circuit ("IC"), such as system on a chip ("SoC" or "SOC"), integrating various hardware and/or software components of computing device 1900 on a single chip.

The computing device 1900 includes a graphics processor 1904. The graphics processor 1904 represents any graphics processor described herein. The graphics processor includes one or more graphics engine(s) 1934, such as the graphics engine 1406 of FIG. 14, or any graphics execution logic described herein, such as the execution logic 600 of FIG. 6. The graphics processor 1904 also includes a graphics microcontroller 1944, such as the graphics microcontroller 1404 of FIG. 14, or the graphics microcontroller 1500 of FIG. 15. The graphics processor 1904 also includes a set of control registers 1954 to configure and control operations for the graphics processor 1904. The control registers 1954 include scheduling control registers that the graphics microcontroller 1944 can use to schedule work items for execution by the one or more graphics engine(s) 1934.

The graphics processor 1904 also includes power management logic 1924 to manage the power state of the graphics processor 1904. The power management logic can transition the graphics processor 1904 into a low power state and return the graphics processor to an operational state in response to a wake event. In one embodiment, the power management logic 1924 can signal the graphics microcontroller 1944 to prepare one or more of the graphic engine(s) 1934 to prepare to enter a low power state. In response, the graphics microcontroller can write to control registers 1954 associated with the one or more graphics engine(s) 1934 to cause the graphics engine(s) to pre-empt currently executing tasks and transition into an idle state. The power management logic 1924 can then transition the graphics engine(s) 1934 to a low power state. In one embodiment, the one or more graphics engine(s) include multiple graphics engines, each separately power managed, such that graphics engines can be separately enabled and disabled while the graphics processor 1904 is operational.

As illustrated, in one embodiment, in addition to a graphics processor 1904, the computing device 1900 may further include any number and type of hardware components and/or software components, such as (but not limited to) an application processor 1906, memory 1908, and input/output (I/O) sources 1910. The application processor 1906 can interact with a hardware graphics pipeline, as illustrated with reference to FIG. 3, to share graphics pipeline functionality. Processed data is stored in a buffer in the hardware graphics pipeline, and state information is stored in memory 1908. The resulting image is then transferred to a display controller for output via a display device, such as the display device 319 of FIG. 3. The display device may be of various types, such as Cathode Ray Tube (CRT), Thin Film Transistor (TFT), Liquid Crystal Display (LCD), Organic Light Emitting Diode (OLED) array, etc., and may be configured to display information to a user.

The application processor 1906 can include one or processors, such as processor(s) 102 of FIG. 1, and may be the central processing unit (CPU) that is used at least in part to execute an operating system (OS) 1902 for the computing device 1900. The OS 1902 can serve as an interface between hardware and/or physical resources of the computer device 1900 and a user. The OS 1902 can include driver logic 1922 for various hardware devices in the computing device 1900. The driver logic 1922 can include graphics driver logic 1923 such as the user mode graphics driver 1026 and/or kernel mode graphics driver 1029 of FIG. 10. In one embodiment the graphics driver logic 1923 is configured to initialize the graphics microcontroller 1944 and can load firmware or scheduling logic into the graphics microcontroller 1944. In one embodiment the graphics driver logic 1923 also includes scheduling logic and can perform scheduling operations for the one or more graphics engine(s) 1934 in the absence of the graphics microcontroller 1944, which may be excluded from some embodiments.

It is contemplated that in some embodiments, the graphics processor 1904 may exist as part of the application processor 1906 (such as part of a physical CPU package) in which case, at least a portion of the memory 1908 may be shared by the application processor 1906 and graphics processor 1904, although at least a portion of the memory 1908 may be exclusive to the graphics processor 1904, or the graphics processor 1904 may have a separate store of memory. The memory 1908 may comprise a pre-allocated region of a buffer (e.g., framebuffer); however, it should be understood by one of ordinary skill in the art that the embodiments are not so limited, and that any memory accessible to the lower graphics pipeline may be used. The memory 1908 may include various forms of random access memory (RAM) (e.g., SDRAM, SRAM, etc.) comprising an application that makes use of the graphics processor 1904 to render a desktop or 3D graphics scene. A memory controller hub, such as memory controller hub 116 of FIG. 1, may access data in the memory 1908 and forward it to graphics processor 1904 for graphics pipeline processing. The memory 1908 may be made available to other components within the computing device 1900. For example, any data (e.g., input graphics data) received from various I/O sources 1910 of the computing device 1900 can be temporarily queued into memory 1908 prior to their being operated upon by one or more processor(s) (e.g., application processor 1906) in the implementation of a software program or application. Similarly, data that a software program determines should be sent from the computing device 1900 to an outside entity through one of the computing system interfaces, or stored into an internal storage element, is often temporarily queued in memory 1908 prior to its being transmitted or stored.

The I/O sources can include devices such as touchscreens, touch panels, touch pads, virtual or regular keyboards, virtual or regular mice, ports, connectors, network devices, or the like, and can attach via an input/output (I/O) control hub (ICH) 130 as referenced in FIG. 1. Additionally, the I/O sources 1910 may include one or more I/O devices that are implemented for transferring data to and/or from the computing device 1900 (e.g., a networking adapter); or, for a large-scale non-volatile storage within the computing device 1900 (e.g., hard disk drive). User input devices, including alphanumeric and other keys, may be used to communicate information and command selections to graphics processor 1904. Another type of user input device is cursor control, such as a mouse, a trackball, a touchscreen, a touchpad, or cursor direction keys to communicate direction information and command selections to GPU and to control cursor movement on the display device. Camera and microphone arrays of the computer device 1900 may be employed to observe gestures, record audio and video and to receive and transmit visual and audio commands.

I/O sources 1910 configured as network interfaces can provide access to a network, such as a LAN, a wide area network (WAN), a metropolitan area network (MAN), a personal area network (PAN), Bluetooth, a cloud network, a cellular or mobile network (e.g., $3^{rd}$ Generation (3G), $4^{th}$ Generation (4G), etc.), an intranet, the Internet, etc. Network interface(s) may include, for example, a wireless network interface having one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Network interface(s) may provide access to a LAN, for example, by conforming to IEEE 802.11 standards, and/or the wireless network interface may provide access to a personal area network, for example, by conforming to Bluetooth standards. Other wireless network interfaces and/or protocols, including previous and subsequent versions of the standards, may also be supported. In addition to, or instead of, communication via the wireless LAN standards, network interface(s) may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

It is to be appreciated that a lesser or more equipped system than the example described above may be preferred for certain implementations. Therefore, the configuration of the computing device 1900 may vary from implementation to implementation depending upon numerous factors, such as price constraints, performance requirements, technological improvements, or other circumstances. Examples include (without limitation) a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any one or a combination of: one or more microchips or integrated circuits interconnected using a parent-board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The following clauses and/or examples pertain to specific embodiments or examples thereof. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system according to embodiments and examples described herein. Various components can be a means for performing the operations or functions described.

In general, embodiments provide for an apparatus comprising a graphics processing subsystem including one or more graphics engines and a graphics scheduler to schedule a submission queue of multiple work items for execution on the one or more graphics engines of the graphics processing subsystem. In one embodiment the graphics scheduler is configured to build the submission queue via a write to a memory mapped address that is mapped to logic within the graphics processing subsystem and to explicitly submit the submission queue to the graphics engine after the build of the submission queue. In one embodiment the submission queue has a maximum number of elements and the graphics scheduler is able to submit the submission queue to the graphics engine with less than the maximum number of elements.

One embodiment provides for a non-transitory machine readable medium storing instructions which, when executed by one or more processors, causes the one or more processors to perform operations to schedule work items for one or more graphics engines within a graphics processing subsystem, the operations including receiving an identifier for a batch of one or more work items for submission to a graphics engine; selecting which of the one or more graphics engines to which the batch of one or more work items is to be submitted; inserting the identifier for the batch of one or more work items into an element of a submission queue associated with a selected graphics engine; and explicitly submitting the elements in the submission queue by writing to a control register.

One embodiment provides for a graphics processing system comprising a first processor including one or more graphics engines; a second processor coupled to the first processor on a single die; and a microcontroller coupled to the first processor. The microcontroller can include scheduling logic to schedule operations for the one or more graphics engines, the scheduling logic configured to schedule a submission queue of multiple work items for execution on the one or more graphics engines. The scheduling logic is configured to build the submission queue via a write to a memory mapped address that is mapped to the first processor and explicitly submit the submission queue to the graphics engine after the build of the submission queue.

One embodiment provides for a system on a chip integrated circuit comprising a first processor and a second processor coupled to the first processor. The second processor includes one or more graphics engines and a microcontroller, the microcontroller including scheduling logic to build a submission queue via a write to a memory mapped address that is mapped to the second processor and explicitly submit the submission queue to the graphics engine after the build of the submission queue, the submission queue including one or more elements, each element referencing one or more work items. One embodiment provides for one or more non-transitory machine readable storage mediums storing data which, when read by one or more machines, causes the one or more machines to manufacture the system on a chip integrated circuit described herein.

In embodiment described herein, the elements in the submission queue can be submitted upon completion of an execution queue of the selected graphics engine. The scheduler can also write to a pre-empt selector of the control register when submitting the elements in the submission queue to halt execution of elements in the execution queue of the selected graphics engine before beginning execution of the elements in the submission queue. In one embodiment, the elements in the submission queue are copied to the execution queue before beginning the execution of the elements in the execution queue.

In one embodiment, the scheduler can write to a pre-empt to idle selector of the control register to cause the graphics engine to halt execution of the elements in an execution queue and copy the elements of the execution queue to the submission queue before transitioning to an idle state. The idle graphics engine can then be transitioned into a low power state. When the graphics engine is transitioned to an operational state the scheduler can resume execution of the execution queue by submitting the submission queue to the graphics engine.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. An apparatus comprising:
a graphics processing subsystem including one or more graphics engines; and
a graphics scheduler to schedule a submission queue capable of storing multiple work items to be loaded into an execution queue for execution on the one or more graphics engines of the graphics processing subsystem, the graphics scheduler to build the submission queue via a memory mapped I/O (MMIO) write operation to a submission port coupled to the submission queue and to explicitly submit at least one work item of the submission queue to the execution queue for the one or more graphics engines to execute the at least one work item after the build of the submission queue.

2. The apparatus as in claim 1, wherein the submission queue has a maximum number of elements to reference multiple work items and the graphics scheduler is to submit the submission queue to the one or more graphics engines with less than the maximum number of elements.

3. The apparatus as in claim 2, wherein the graphics scheduler is to append additional work items after the submission queue is submitted.

4. The apparatus as in claim 1, wherein the one or more graphics engines are to execute multiple work items in the submission queue in the execution queue after the graphics scheduler explicitly submits the submission queue.

5. The apparatus as in claim 4, wherein the graphics scheduler is to write to a memory mapped I/O (MMIO) address and cause one of the one or more graphics engines of the graphics processing subsystems to pre-empt an executing work item.

6. The apparatus as in claim 5, wherein the one or more graphics engines are to pre-empt the executing work item and transition to an idle state.

7. The apparatus as in claim 6, wherein the graphics processing subsystem includes context storage memory to store information associated with an executing context of a graphics engine that is pre-empted and transitioned to the idle state is to store context information associated with the executing work item to context storage memory before the transition to the idle state.

8. The apparatus as in claim 7, wherein the one of the one or more graphics engines that is pre-empted and transitioned to the idle state is to store the execution queue to the submission queue as a partially executed submission queue before the transition to the idle state, and the graphics processing system is further to transition the one or more graphics engines to a low power state after the transition to the idle state.

9. The apparatus as in claim 8, wherein the graphics processing subsystem is to transition an idle graphics engine to an operational state and the graphics scheduler is to re-submit the partially executed submission queue to the graphics engine via a register write.

10. A non-transitory machine readable medium storing instructions which, when executed by one or more processors, causes the one or more processors to perform operations to schedule work items for one or more graphics engines within a graphics processing subsystem, the operations including:
receiving an identifier for a batch of one or more work items for submission to a graphics engine;
selecting which of the one or more graphics engines to which the batch of one or more work items is to be submitted;
inserting the identifier for the batch of one or more work items into an element of a submission queue, the one or more work items to be loaded into an execution queue for execution by the selected graphics engine, wherein the work items are written to the submission queue via a memory mapped I/O (MMIO) operation; and
explicitly submitting at least one work item in the submission queue to the execution queue by writing to a control register.

11. The non-transitory machine readable medium as in claim 10, wherein each element in the submission queue is submitted upon completion of at least one work item in the execution queue of the selected graphics engine.

12. The non-transitory machine readable medium as in claim 11, the operations additionally including:
writing to a pre-empt selector of the control register when submitting each element in the submission queue to halt execution of one or more work items in the execution queue of the selected graphics engine.

13. The non-transitory machine readable medium as in claim 12, the operations additionally including copying one or more work items from the submission queue to the execution queue before beginning the execution of one or more work items in the execution queue.

14. The non-transitory machine readable medium as in claim 10, the operations additionally including:
writing to a pre-empt to idle selector of the control register to cause the graphics engine to halt execution of one or more work items in the execution queue and copy one or more work items of the execution queue to the submission queue as a partially executed submission queue before transitioning to an idle state; and
transitioning an idle graphics engine to a low power state.

15. The non-transitory machine readable medium as in claim 14, the operations additionally including transitioning a graphics engine in a low power state to an operational state and resuming execution of the one or more work items in the execution queue by re-submitting the partially executed submission queue.

16. A graphics processing system comprising:
a first processor including one or more graphics engines;
a second processor coupled to the first processor on a single die; and
a microcontroller including scheduling logic to schedule operations for the one or more graphics engines, the scheduling logic configured to schedule a submission queue capable of storing multiple work items to be loaded into an execution queue for execution on the one or more graphics engines, the scheduling logic to build the submission queue via a memory mapped I/O (MMIO) write operation to a submission port coupled to the submission queue and explicitly submit at least one work item of the submission queue to the execution queue for the one or more graphics engines to execute the at least one work item after the build of the submission queue.

17. The graphics processing system as in claim 16, wherein the submission queue has a maximum number of elements to reference the one or more work items and the scheduling logic is to submit at least one work item in the submission queue to the execution queue for execution by one or more of the graphics engine with less than the maximum number of elements.

18. The graphics processing system as in claim 17, wherein the scheduling logic is to append additional work items after the submission queue is submitted.

19. The graphics processing system as in claim 16, wherein the one or more graphics engines are to execute the one or more work items in the execution queue after the scheduling logic explicitly submits the submission queue to the execution queue.

20. The graphics processing system as in claim 19, wherein the scheduling logic is to write to a memory mapped I/O (MMIO) address and cause a graphics engine of the one or more graphics engines to pre-empt an executing work item and transition to an idle state.

* * * * *